(12) United States Patent
Nawata

(10) Patent No.: US 11,733,738 B2
(45) Date of Patent: Aug. 22, 2023

(54) ELECTRONIC DEVICE

(71) Applicant: Dynabook Inc., Tokyo (JP)

(72) Inventor: Takashi Nawata, Tokyo (JP)

(73) Assignee: DYNABOOK INC., Tokyo (JP)

(*) Notice: Subject to any disclaimer, the term of this patent is extended or adjusted under 35 U.S.C. 154(b) by 0 days.

(21) Appl. No.: 17/659,153

(22) Filed: Apr. 13, 2022

(65) Prior Publication Data

US 2023/0056820 A1 Feb. 23, 2023

(30) Foreign Application Priority Data

Aug. 23, 2021 (JP) ................. 2021-135705

(51) Int. Cl.
*G06F 1/16* (2006.01)
*H01M 50/247* (2021.01)

(52) U.S. Cl.
CPC ........ *G06F 1/1679* (2013.01); *H01M 50/247* (2021.01); *H01M 2220/30* (2013.01)

(58) Field of Classification Search
CPC .. G06F 1/1679; G06F 1/1635; H01M 50/247; H01M 2220/30; H04M 1/0262
See application file for complete search history.

(56) References Cited

U.S. PATENT DOCUMENTS

| 6,515,450 B1 | 2/2003 | Kaiho et al. |
| 2007/0148535 A1 | 6/2007 | Nagai et al. |
| 2018/0220543 A1* | 8/2018 | Hibino ................ H04M 1/0262 |

FOREIGN PATENT DOCUMENTS

| CN | 1365523 A | 8/2002 |
| EP | 0 709 761 A1 | 5/1996 |
| EP | 1 188 193 A1 | 3/2002 |
| JP | 2001-285431 A | 10/2001 |
| JP | 2010-56811 A | 3/2010 |
| JP | 5094638 B2 | 12/2012 |

* cited by examiner

*Primary Examiner* — Anthony Q Edwards
*Assistant Examiner* — Bryan Van Huynh
(74) *Attorney, Agent, or Firm* — Knobbe, Martens, Olson & Bear LLP

(57) ABSTRACT

According to one embodiment, an electronic device includes a housing including a mounting part, installation component installed in the mounting part, and detaching/attaching mechanism capable of detaching the installation component in a first direction. The detaching/attaching mechanism includes an operating lever including a first protrusion which includes a first abutting face and second abutting face, a second protrusion which includes a third abutting face, and a third protrusion which includes a fourth abutting face. At least one of the first abutting face and third abutting face is inclined, and at least one of the second abutting face and fourth abutting face is inclined.

5 Claims, 20 Drawing Sheets

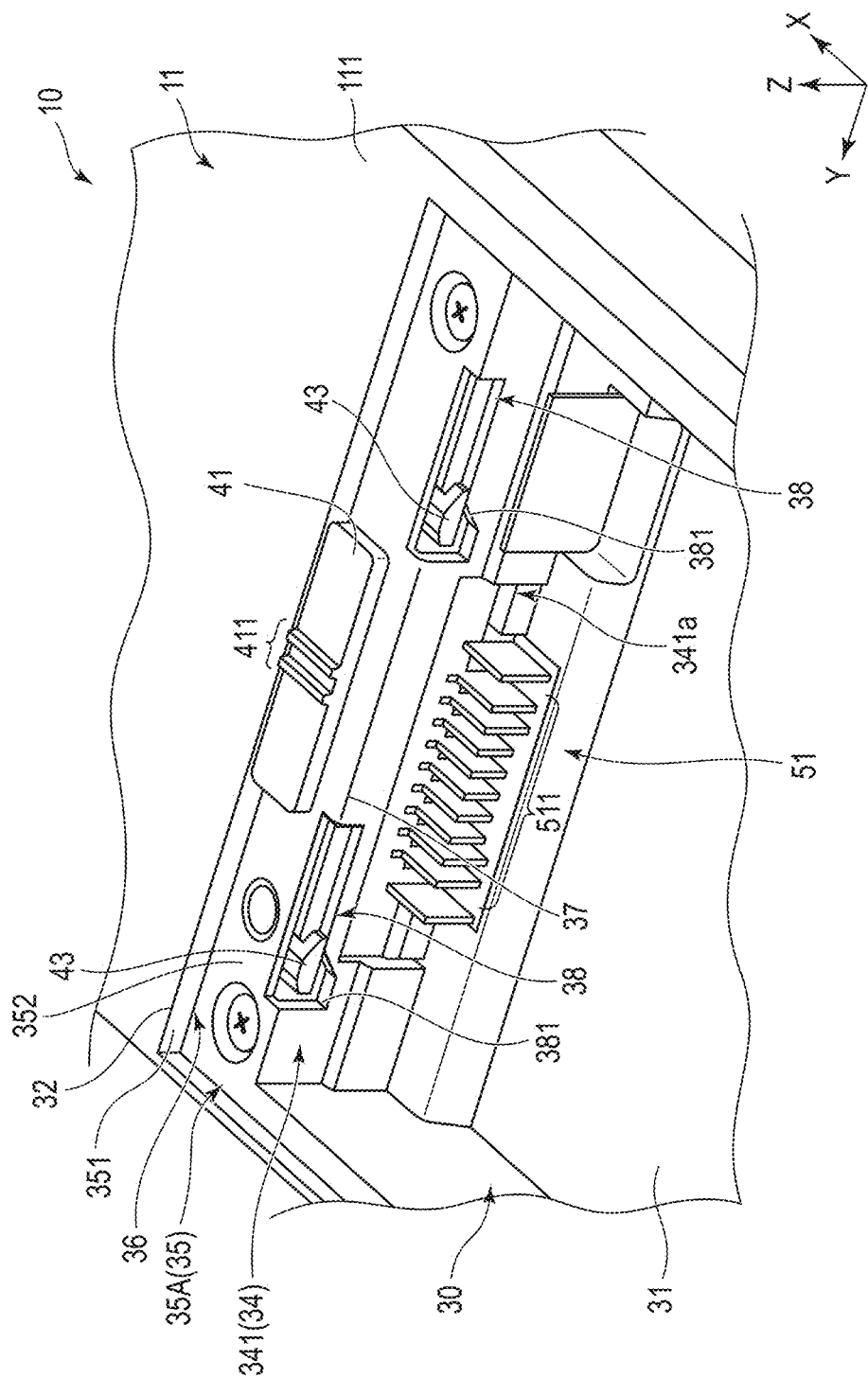
F I G. 4

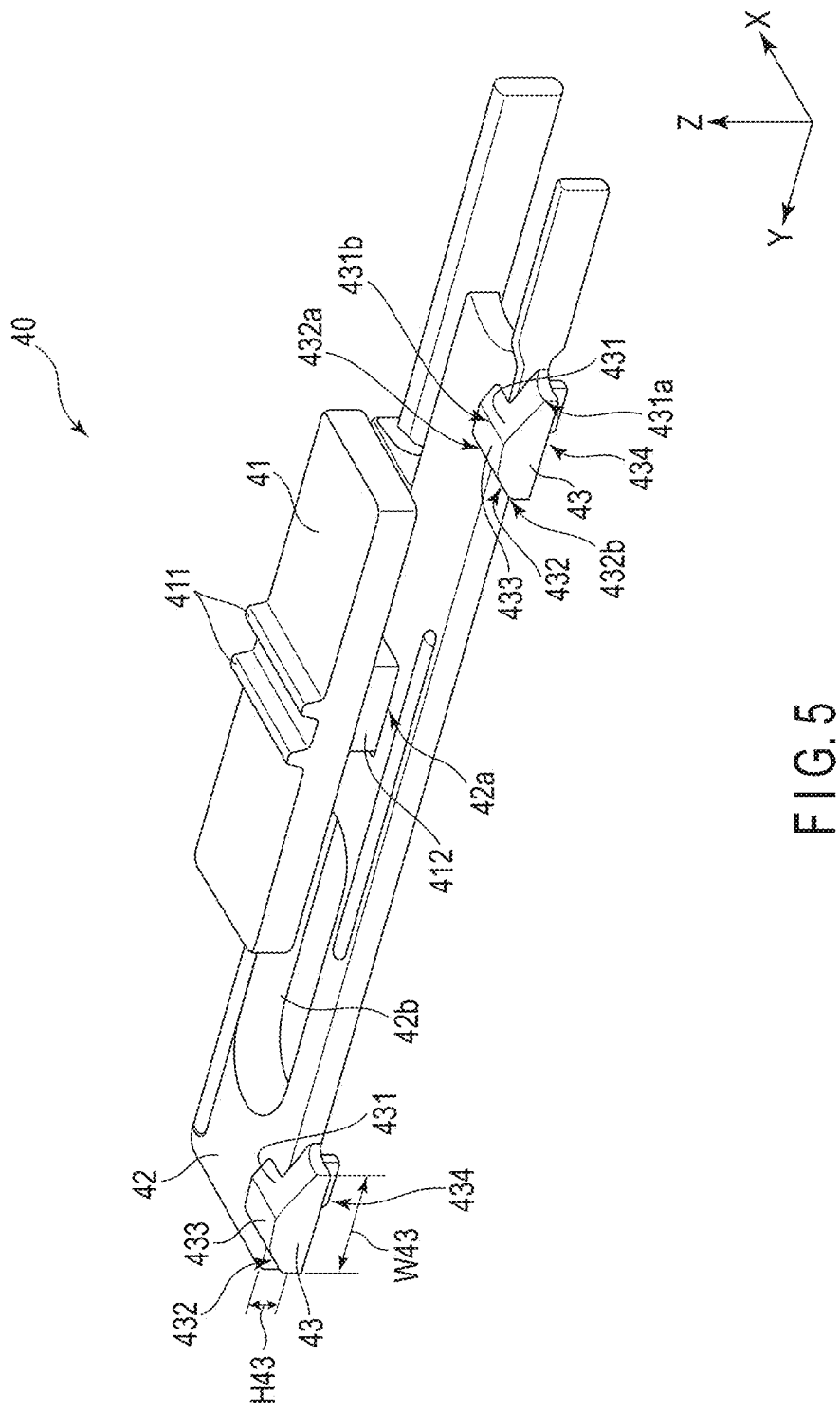
F I G. 5

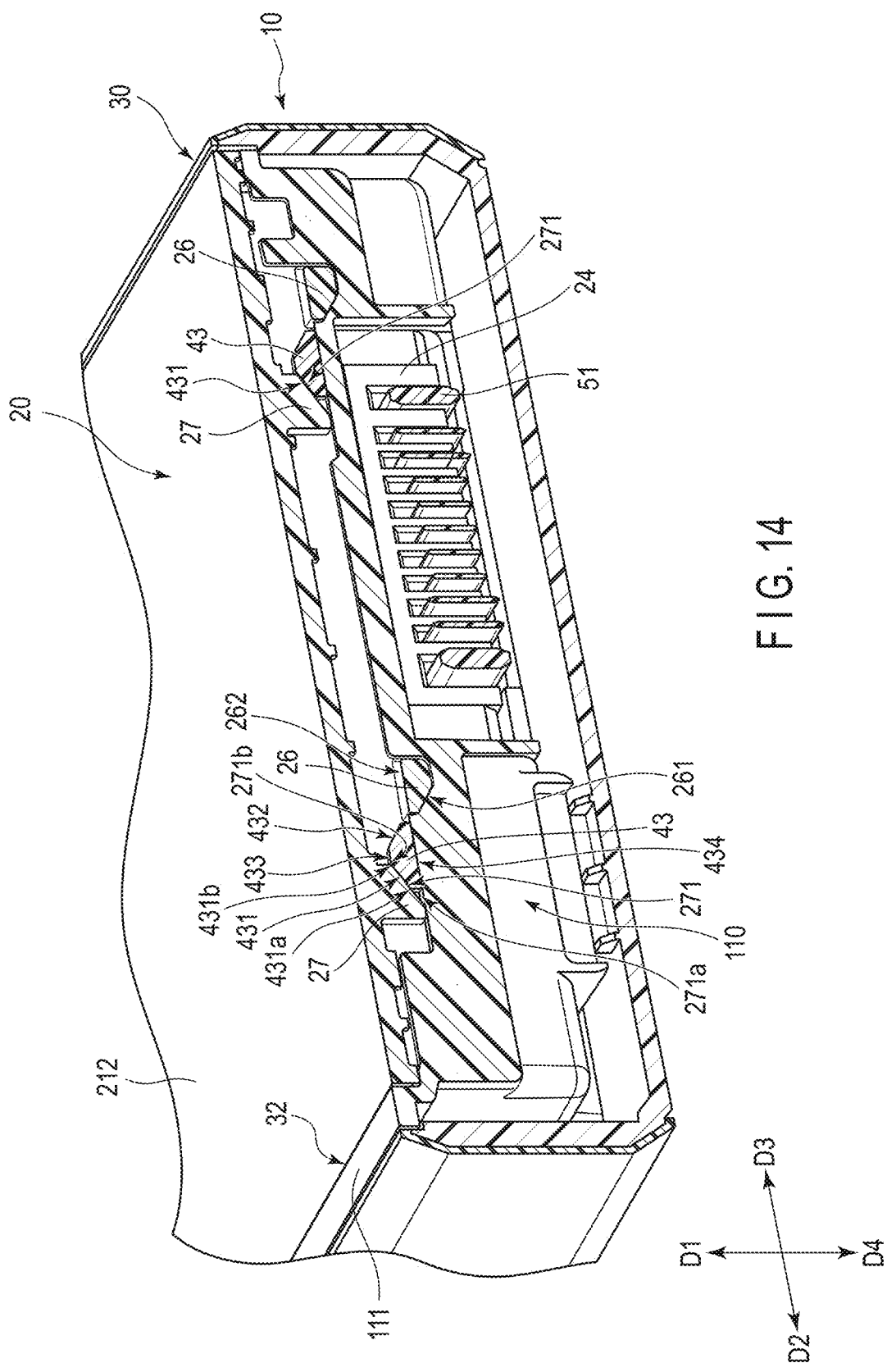
F I G. 14

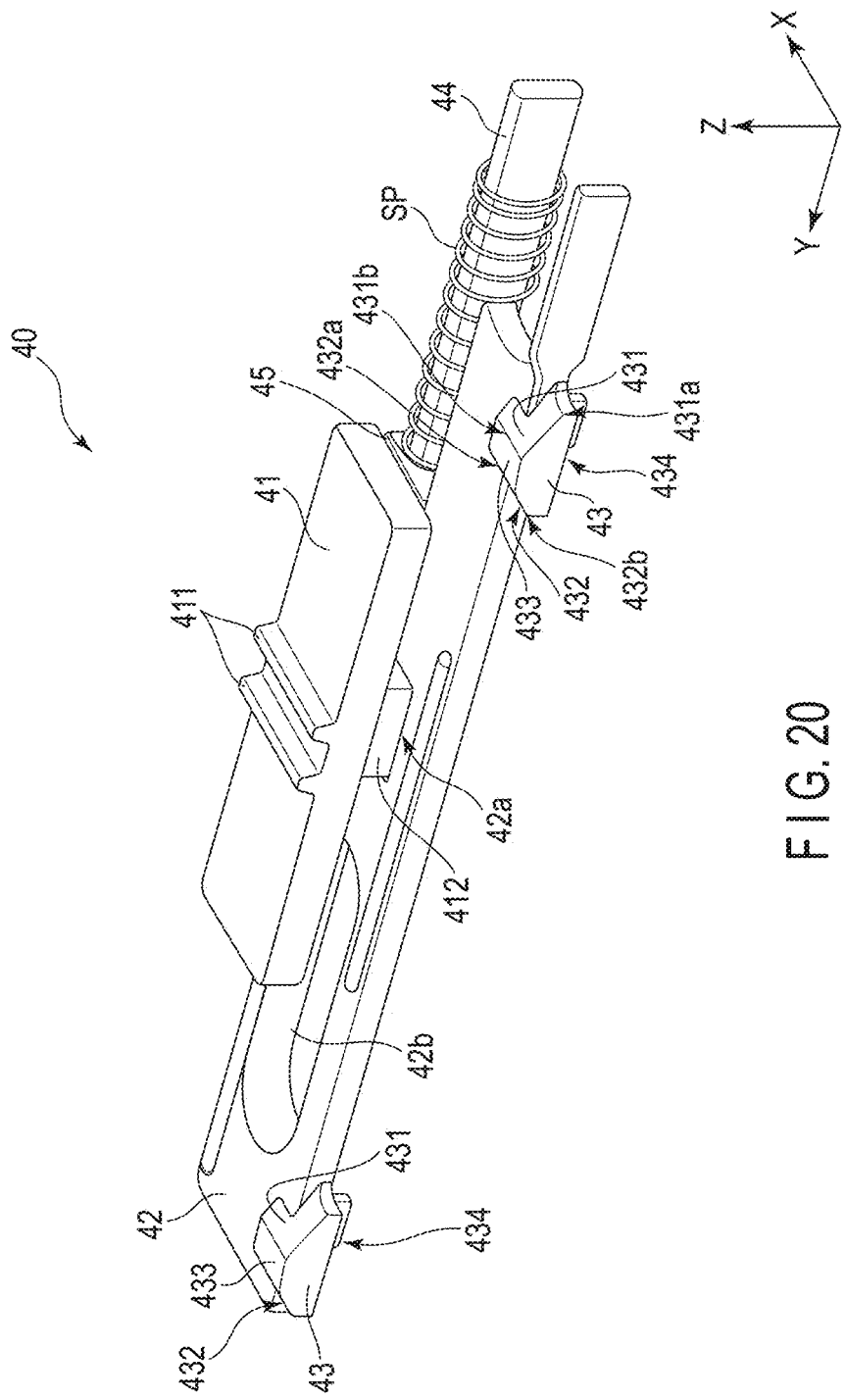
F I G. 20

ELECTRONIC DEVICE

CROSS-REFERENCE TO RELATED APPLICATIONS

This application is based upon and claims the benefit of priority from Japanese Patent Application No. 2021-135705, filed Aug. 23, 2021, the entire contents of which are incorporated herein by reference.

FIELD

Embodiments described herein relate generally to an electronic device.

BACKGROUND

As an example of an electronic device, a portable PC such as a notebook personal computer (notebook PC) called a laptop, mobile personal computer (mobile PC) or the like is known. The electronic device includes a housing having a mounting part, and installation component installed in the mounting part such as a battery pack or the like. The electronic device further includes a mechanism configured to detach the installation component from the mounting part.

The mechanism includes, for example, an operating lever movably provided on the mounting part. When the operating lever is moved, the installation component is raised higher relatively to the mounting part, and a gap is formed between the installation component and mounting part. The user can detach the installation component from the mounting part by inserting a finger of the user into the gap thus formed.

BRIEF DESCRIPTION OF THE DRAWINGS

FIG. 4 is an enlarged perspective view showing a part of a mounting part of a housing shown in FIG. 3.

FIG. 5 is a perspective view of an operating lever shown in FIG. 3.

FIG. 14 is a view for explaining the process of detaching the battery pack by means of the detaching/attaching mechanism.

FIG. 20 is a perspective view of an operating lever of an electronic device in a second embodiment.

DETAILED DESCRIPTION

Figure 1:
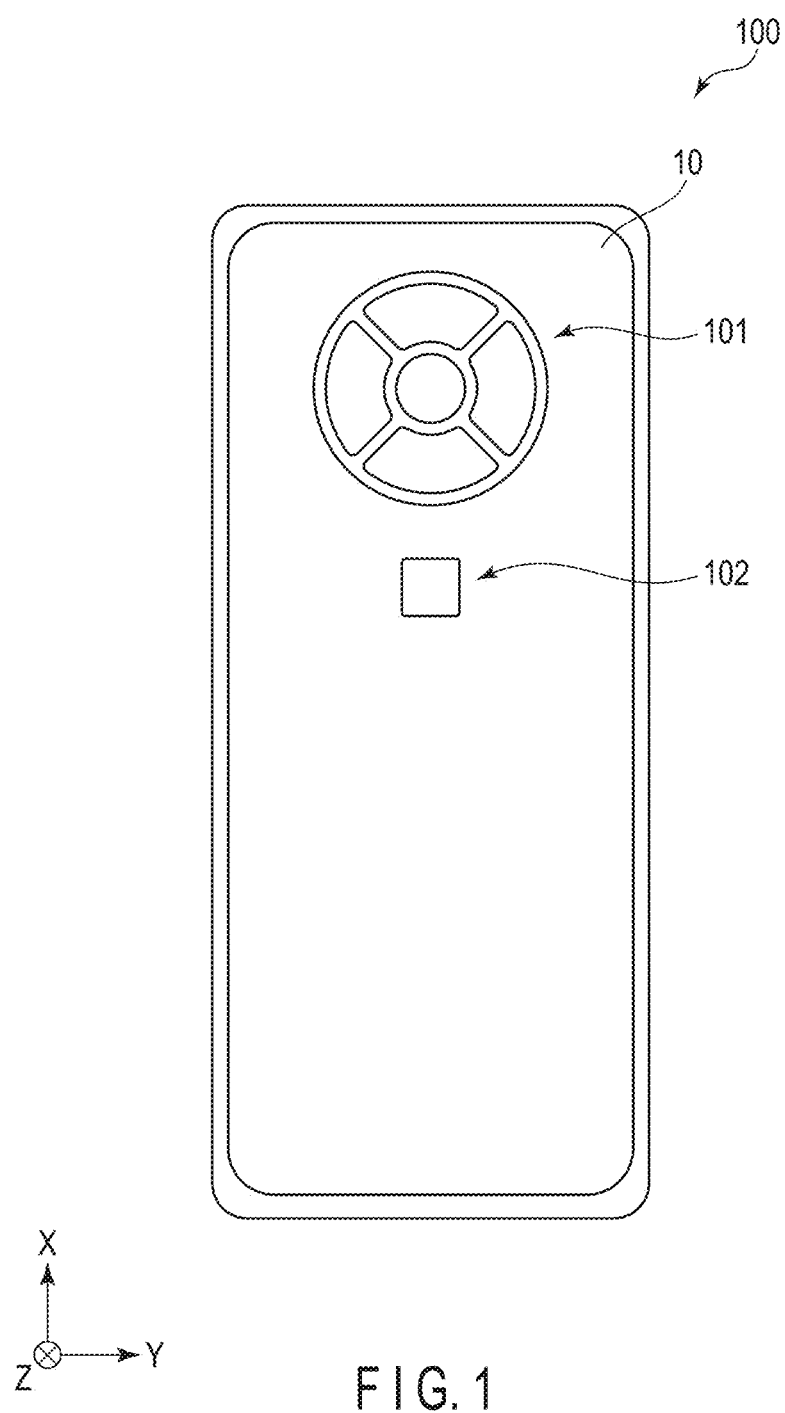
FIG. 1 is a front view showing an example of an electronic device in a first embodiment.

In general, according to one embodiment, an electronic device comprises a housing having a mounting part including an inner wall part, an installation component including a face at a position opposed to the inner wall part at the time when the installation component is installed into the mounting part and to be detachably attached to the mounting part, and a detaching/attaching mechanism capable of detaching the installation component from the mounting part in a first direction.

The detaching/attaching mechanism includes an operating lever including a first protrusion which includes a first abutting face and a second abutting face and which is provided in the mounting part and movable in a second direction different from the first direction, a second protrusion which includes a third abutting face provided at such a position that the third abutting face can abut on the first abutting face and which is provided on the installation component so as to protrude from the face of the installation component, and a third protrusion which includes a fourth abutting face provided at such a position that the fourth abutting face can abut on the second abutting face and is provided on the installation component so as to protrude from the face of the installation component at a position separate from the second protrusion in the first direction and in the second direction.

The operating lever is provided in the housing in such a manner as to be movable in the second direction and in a third direction which is a direction opposite to the second direction between a first position at which the first abutting face of the first protrusion and the third abutting face of the second protrusion abut on each other and a second position at which the second abutting face of the first protrusion and the fourth abutting face of the third protrusion abut on each other after passing through the first position.

At least one of the first abutting face and the third abutting face is inclined in such a manner that relative positions of the first protrusion and the second protrusion in the first direction at the time when the operating lever is moved in the second direction in a state where the installation component is installed in the mounting part change in the first direction with the movement of the operating lever in the second direction.

At least one of the second abutting face and the fourth abutting face is inclined in such a manner that relative positions of the first protrusion and the third protrusion in the first direction at the time when the operating lever is moved in the third direction after the installation component is moved in the first direction relatively to the mounting part by abutting of the first abutting face and the third abutting face on each other change in the first direction with the movement of the operating lever in the third direction.

Electronic devices of the embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

It should be noted that in the embodiments of the present invention, an X direction, Y direction, and Z direction are defined. Although the X direction, Y direction, and Z direction intersect each other at right angles, these directions may intersect each other at an angle other than 90°. The X direction is a direction along the vertical direction (longitudinal direction) of the electronic device. The Y direction is a direction along the lateral direction (width direction) of the electronic device. The Z direction is a direction along the thickness direction of the electronic device. Hereinafter, viewing an X-Y plane defined by the X direction X and Y direction is called planar view. There is sometimes a case where one side of the electronic device in the X direction is called the "upper part" or "upside", and the other side is called the "lower part" or "downside" with the direction in which the electronic device is viewed from the front side used as the criterion.

First Embodiment

First, an example of the electronic device will be described below. In this embodiment, a mobile PC is disclosed as an example of an electronic device 100. There is sometimes d case where the mobile PC is also called a mobile edge computing device. Such a mobile PC constitutes a part of a remote support system for realizing, for example, edge computing. The remote support system is a system by which an operator at the rear supports a user, for example, a worker at the job site from the remote place.

Figure 2:
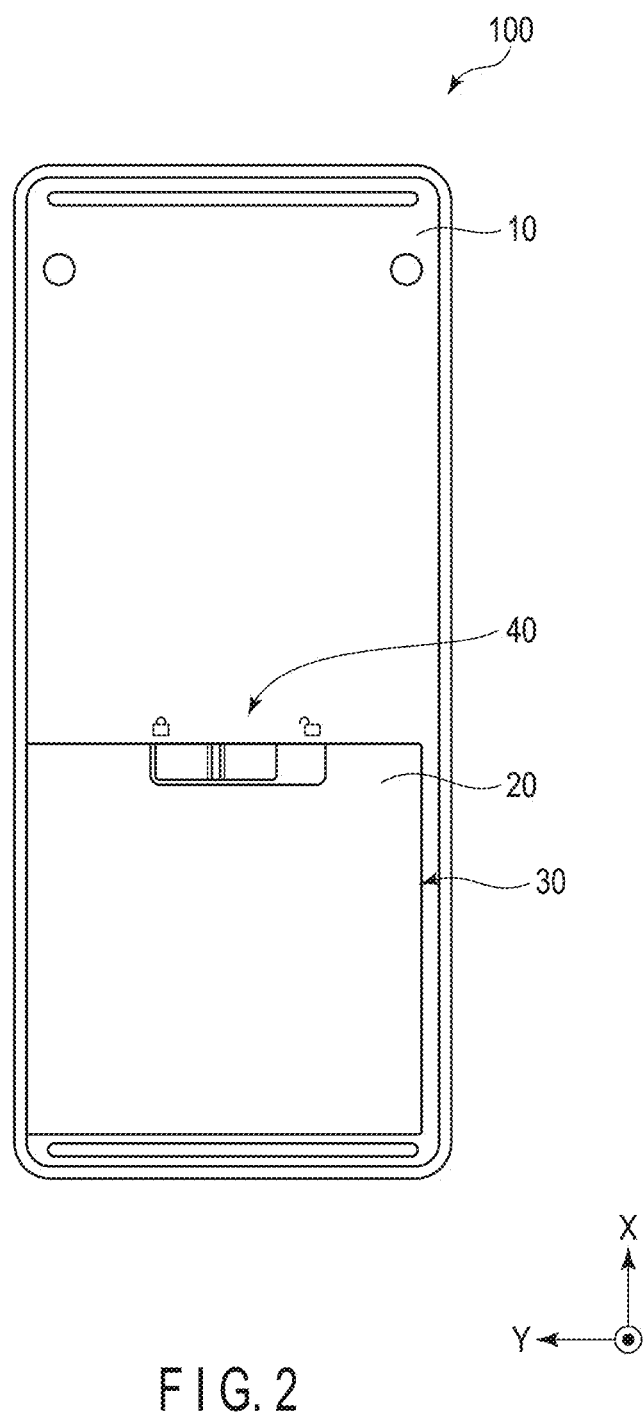
FIG. 2 is a rear view showing the example of an electronic device in the first embodiment.

FIG. 1 is a front view showing an example of the electronic device 100 in a first embodiment. FIG. 2 is a rear view showing the example of the electronic device 100 in the first embodiment. The electronic device 100 has an external shape of a flat and approximately rectangular parallelepiped. Here, the shape of an approximately rectangular parallelepiped includes a shape of a rectangular parallelepiped in which various shapes such as roundness, bend, flection, step, concavity/convexity, and the like are added to one of the corner part, ridge line, and surface part. The electronic device 100 has a size that can be held with, for example, one hand. The user of the electronic device 100 holds the electronic device 100 in a vertically long form at the time of use.

As shown in FIG. 1 and FIG. 2, the electronic device 100 includes a housing 10, installation component which can be installed into a mounting part 30, and detaching/attaching mechanism to be described later. In this embodiment, as an example of the installation component, a battery pack is disclosed (hereinafter, the installation component is referred to as a battery pack 201.

As shown in FIG. 1, on the front side of the electronic device 100, an operating part 101 constituted of a plurality of buttons, and fingerprint sensor 102 are provided. On the rear surface side of the electronic device 100, a mounting part 30 in which the battery pack 20 is installed. In the example shown in FIG. 2, the battery pack 20 is detachably installed in the mounting part 30.

As shown in FIG. 2, on the housing 10, an operating lever 40 constituting the detaching/attaching mechanism to be described later is movably (slidably) provided. The operating lever 40 can be moved in the Y direction and direction opposite to the Y direction. Hereinafter, the direction in which the operating ever 40 is moved is called the "sliding direction".

Although not shown in FIG. 2, on the upper side face of the electronic device 100, a power switch, power light emitting diode (LED), universal serial bus (USB) 3.0 standard connector, USB type-C standard connector, and the like are provided.

Figure 3:
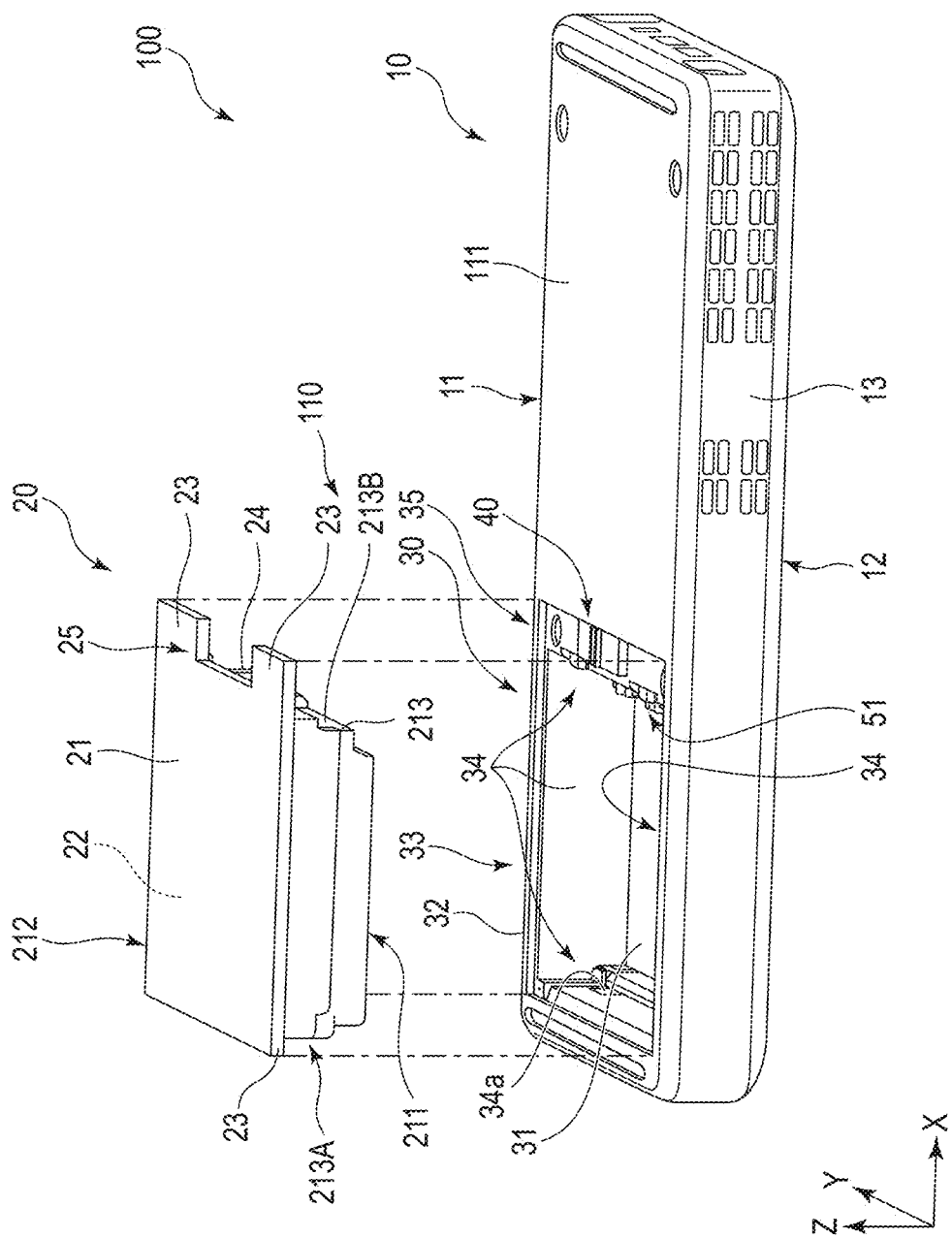
FIG. 3 is an exploded perspective view of the electronic device shown in FIG. 1 and FIG. 2.

FIG. 3 is an exploded perspective view of the electronic device 100 shown in FIG. 1 and FIG. 2. As described above, the electronic device 100 includes the housing 10 and battery pack 20 installed in the mounting part 30. The housing 10 accommodates therein a circuit board on which electronic components are mounted, and the like. The housing 10 is formed an insulator. An example of the insulator is a resin material of polycarbonate ABS. Although as other materials, there are polystyrene, acrylic resin, polypropylene, and the like, the insulator is not limited to the resin material.

The housing 10 is a shape of an approximately rectangular parallelepiped. The housing 10 includes a wall part 11 having an outer surface 111, wall part 12 opposed to the wall part 11 in the Z direction, and sidewall part 13 connecting the wall part 11 and wall part 12 to each other. The wall part 11 constitutes the rear surface of the electronic device 100, wall part 12 constitutes the front surface of the electronic device 100, and sidewall part 13 constitutes the side face of the electronic device 100.

The housing 10 includes a mounting part 30 opened to the outer surface 111. The mounting part 30 is depressed from the outer surface 111. The mounting part 30 is formed on the lower part side of the electronic device 100. The mounting part 30 is opened in a shape of an approximately rectangle in planar view.

The mounting part 30 includes a bottom wall 31, installation open end 32, and inner wall part 33 between the bottom wall 31 and installation open end 32. The inner wall part 33 includes an inner wall 34 extending from the bottom wall 31 in the L direction Z and step part 35 formed between the inner wall 34 and installation open end 32. As an example, the bottom wall 31 is constituted of the wall part 12, and inner wall part 33 is constituted of the wall part 11 and sidewall part 13.

In the mounting part 30, on the inner wall 34 (sidewall 341 shown in FIG. 4) on one side in the X direction, a first connector 51 is provided so as to be directed toward the inner space surrounded by the inner wall part 33. The first connector 51 is, as an example, a male connector and includes connecting terminals to be connected to a second connector to be described later.

In the mounting part 30, a concave part 34a for positioning the battery pack 20 to the mounting part 30 is provided in the inner wall 34 on the other side thereof in the X direction. Although not shown, two concave parts 34a are formed in the Y direction.

The battery pack 20 is a power source of the electronic device 100. The battery pack 20 includes a battery case 21, battery cells 22 accommodated in the battery case 21, and second connector 24 electrically connected to the battery cells 22. Inside the battery case 21, a space for accommodating the battery cells 22 is formed. The battery pack 20 includes at least one (for example, two battery cells 22) battery cell 22. The battery cell 22 is, for example, a secondary cell.

The battery case 21 is formed of an insulator material of a kind identical to, for example, the housing 10. From another point of view, the battery pack 20 is covered with the insulator. The battery case 21 is a shape of an approximately rectangular parallelepiped. The battery case 21 includes a principal surface 211, principal surface 212 on the opposite side of the principal surface 211 in the Z direction, peripheral surface 213 extending from the principal surface 211 in the Z direction, and flange part 23 protruding from the peripheral surface 213. The flange part 23 protrudes from the peripheral surface 213 in the X direction, direction opposite to the X direction, Y direction, and direction opposite to the Y direction.

At the time when the battery pack 20 is installed in the mounting part 30, the principal surface 211 is opposed to the bottom wall 31, peripheral surface 213 is opposed to the inner wall 34, and flange part 23 overlaps the step part 35 in the Z direction. The peripheral surface 213 includes a face 213A to be opposed to the part of the inner wall 34 provided with the concave part 34a, and face 213B to be opposed to the part of the inner wall 34 provided with the first connector 51 at the time when the battery pack 20 is installed into the mounting part 30.

On the face 213B side, a second connector 24 is provided. The second connector 24 is, as an example, a female connector, and includes connecting terminals to be connected to the first connector 51. The flange part 23 is provided with, on one side thereof in the X direction, a cutout part 25 for not hindering the ever 40 in the movement thereof.

A detaching/attaching mechanism 110 is used when the battery pack 20 is attached/detached to/from the mounting part 30. For example, the user can detach the battery pack 20 from the mounting part 30 in the Z direction by means of the detaching/attaching mechanism 110. The detaching/attaching mechanism 110 includes an operating lever 40 provided in the housing 30 and protrusions (protrusions 26, 27 shown in FIG. 6) to be described later formed on the face 213B.

FIG. 4 is an enlarged perspective view showing a part of the mounting part 30 of the housing 10 shown in FIG. 3. In FIG. 4, of the parts inside the mounting part 30, the part at which the first connector 51 is provided is mainly enlarged. As described above, the mounting part 30 includes the bottom wall 31, installation open end 32, inner wall 34, and step part 35.

The inner wall 34 includes the sidewall 341 on one side thereof in the X direction. The sidewall 341 is connected to the step part 35, and is positioned between the bottom wall 31 and step part 35. The first connector 51 protrudes from an opening 341a provided in the sidewall 341 toward the mounting part 30. The first connector 51 includes a plurality of plate-like connecting terminals 511 arranged in line in the Y direction. In the sidewall 341, an opening or the like for insertion of a SIM card may also be formed.

Next, of the portions of the step part 35, a step part 35A connected to the sidewall 341 will mainly be described. The step part 35A includes a first step face 351 extending from the installation open end 32 formed on the outer surface 111, second step face 352 extending in the direction intersecting the first step face 351, corner part 36 formed between the first step face 351 and second step face 352, and corner part 37 formed between the second step face 352 and sidewall 341. In planar view, the opening including the corner part 37 is smaller than the opening formed by the installation open end 32.

As shown in FIG. 4, the first step face 351 extends in the direction opposite to the Z direction from the installation open end 32 and in the Y direction. The second step face 352 extends in the direction opposite to the X direction from the first step face 351 and in the Y direction.

Furthermore, the mounting part 30 includes openings 38 at the corner part 37. Two openings 38 are formed along the Y direction. Each of the openings 38 is formed in such a manner as to cut out the step part 35 and sidewall 341 at the wall part 11 constituting the inner wall part 33.

In each of the openings 38, each of protrusions 43 of the operating lever 40 is provided from inside the housing 10. The opening 38 has an oblong shape along the sliding direction of the operating lever 40. Accordingly, the protrusion 43 can be moved in the sliding direction inside the opening 38. The opening 38 includes a concave part 381 formed in the sidewall 341 on one side thereof in the Y direction.

Next, the operating lever 40 constituting the detaching/attaching mechanism 110 will be described. FIG. 5 is a perspective view of the operating lever 40 shown in FIG. 3. In FIG. 5, the X direction, Y direction, and Z direction are shown with the direction in which the operating lever 40 is arranged in the housing 10 as shown in FIG. 3 used as the criterion.

By operating the operating lever 40, the user can switch the state at the detaching/attaching mechanism 110 between the locked state where the battery pack 20 cannot be detached from the mounting part 30 and released state where the battery pack 20 can be detached from the mounting part 30.

The operating lever 40 is formed of, for example, a resin material. The operating lever 40 includes an operating knob 41, main body part 42 coupled to the operating knob 41, and a pair of protrusions 43 (first protrusions) protruding from the main body part 42. Hereinafter, the pair of protrusions 43 is collectively called the "protrusion 43". There is sometimes a case where the main body part 42 is also called a latch. In the operating lever 40, each of the operating knob 41 and main body part 42 may be constituted of separate components as shown in FIG. 5 or may be constituted of one component.

By moving the operating knob 41, the user can move the main body part 42. As shown in FIG. 4, the operating knob 41 is provided along the second step face 352. The operating knob 41 is a plate-like member having an approximately rectangular shape the longitudinal direction of which is the sliding direction of the operating lever 40. The operating knob 41 includes a finger-hold 411 and coupler 412.

By hooking the user's finger on the finger-hold 411, the user can easily move the operating knob 41 in the sliding direction. The finger-hold 411 is formed at a central part of the face of the operating knob 41 on one side thereof in the Z direction. In the example shown in FIG. 5, the finger-hold 411 is constituted of two protrusions protruding in the Z direction.

The protrusions extend in the X direction. From another point of view, the protrusions extend in the direction intersecting (for example, direction orthogonal to) the sliding direction of the operating lever 40. The length of the protrusions in the X direction is approximately equal to the length of the operating knob 4 in the X direction. The number of the protrusions may be one or may be three or more. It should be noted that the finger-hold 411 may be constituted of something having a shape other than the protrusions.

The coupler 412 couples the operating knob 41 to the main body part 42. The coupler 412 is formed at a central part of the face of the operating knob 41 on the other side thereof in the Z direction. The coupler 412 protrudes in the direction opposite to the finger-hold 411.

The main body part 42 is provided inside the housing 10 along the face on the opposite side of the second step face 352. The main body part 42 is a plate-like member having an approximately rectangular shape the longitudinal direction of which is the sliding direction of the operating lever 40. The main body part 42 is longer than the operating knob 41 in the length in the Y direction.

In the main body part 42, openings 42a and 42b are formed. Each of the openings 42a and 42b is a through-hole formed in the Y direction. As shown in FIG. 5, in the opening 42a, the coupler 412 is inserted. The opening 42b has an oblong shape along the sliding direction.

As shown in FIG. 5, protrusions 43 protrude from the main body part 42 in the direction opposite to the X direction. As shown in FIG. 4, each of the protrusions 43 is exposed from the mounting part 30 through each of the openings 38. The protrusion 43 has a shape of a prismatic column and has a plurality of faces. The protrusion 43 has, for example, an approximately trapezoidal shape.

The protrusion 43 has an abutting face 431 (first abutting face) on one side thereof in the Y direction, abutting face 432 (second abutting face) on the other side in the Y direction, contiguous face 433 between the abutting face 431 and abutting face 432 on one side in the Z direction, and engaging face 434 on the other side in the Z direction. The engaging face 434 is a face different from the abutting face 431 and abutting face 432. When the operating lever 40 is provided in the housing 10, the engaging face 434 is positioned on the bottom wall 31 side of the contiguous face 433.

The abutting face 431 includes an end part 431a on one end side thereof in the Y direction and end part 431b on the other end side in the Y direction. The abutting face 431 is contiguous to the contiguous face 433 at the end part 431b. The abutting face 432 includes an end part 432a on one end side thereof in the Y direction and end part 432b on the other side in the Y direction. The abutting face 432 is contiguous to the contiguous face 433 at the end part 432a.

The contiguous face 433 and engaging face 434 are each faces approximately parallel to both the Y direction and X direction. The length of the contiguous face 433 in the Y direction is less than the length of the engaging face 434 in the Y direction. The abutting face 431 and abutting face 432 are inclined faces. As shown in FIG. 5, each of the abutting face 431 and abutting face 432 is inclined in such a manner that the distance between the face 431 or face 432 and engaging face 434 becomes less from the contiguous face 433 to the end part 431a or end part 432b. Accordingly, moving of the abutting face 431 in the other side direction of the Y direction makes a member in contact with the abutting face 431 undergo the force of pushing the member in the Z direction. Further, moving of the abutting face 43d in one side direction of the Y direction makes a member in contact with the abutting face 432 undergo the force of pushing the member in the Z direction.

The length in the Z direction from the end part 431a to the end part 431b is approximately equal to the length in the Z direction from the end part 432a to the end part 432b. Each of the length in the Z direction from the end part 431a to the end part 431b and length in the Z direction from the end part 432a to the end part 432b is set as a height H43, and the length of the protrusion 43 in the Y direction is set as the width W43.

It should be rioted that the protrusion 43 may not include the contiguous face 433. In this case, the end part 431b of the abutting face 431 and end part 432a of the abutting face 432 are directly connected to each other. Possession of the contiguous face 433 by the protrusion 43 makes it possible to secure the strength of the protrusion 43.

Figure 6:
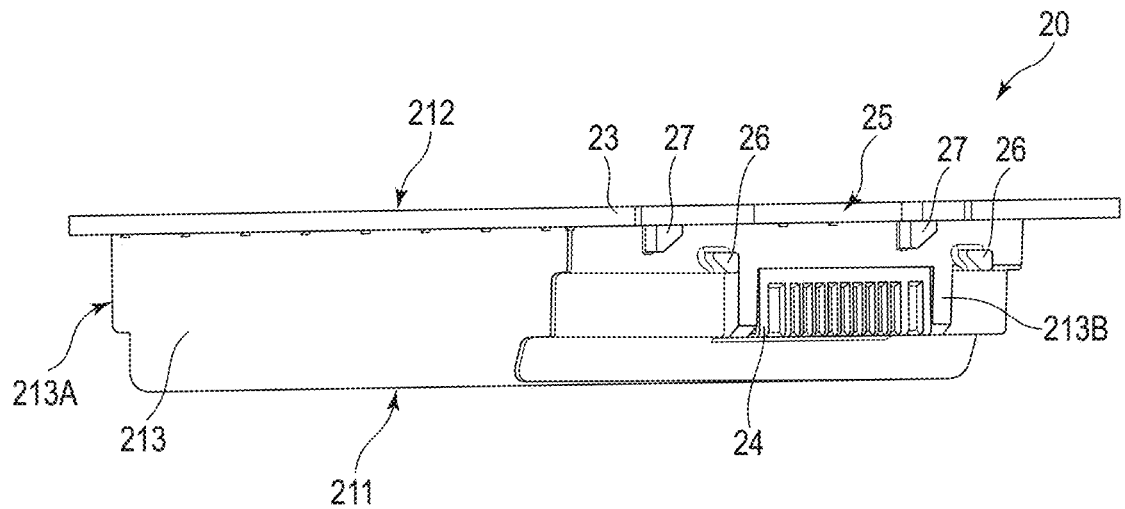
FIG. 6 is a perspective view of a battery pack shown in FIG. 3.
Figure 7:
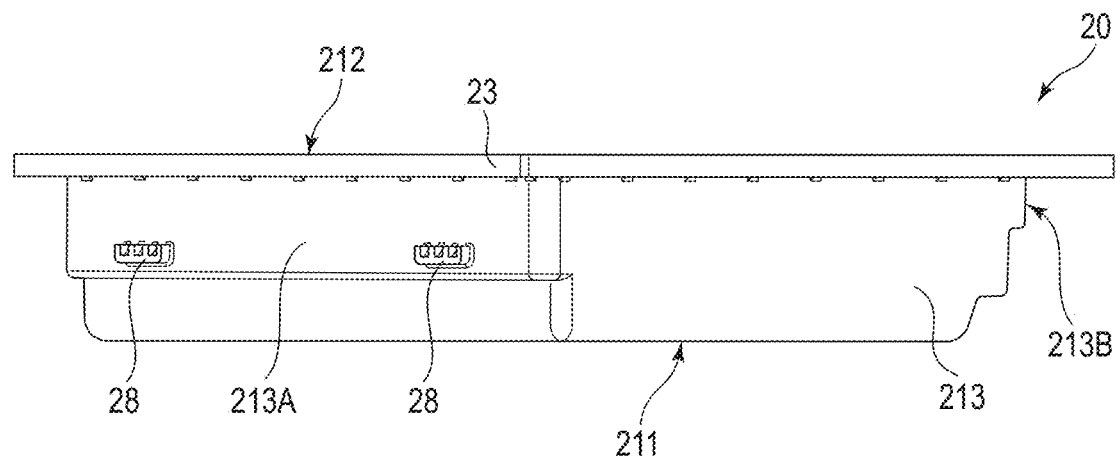
FIG. 7 is a perspective view of the battery pack shown in FIG. 3.
Figure 8:
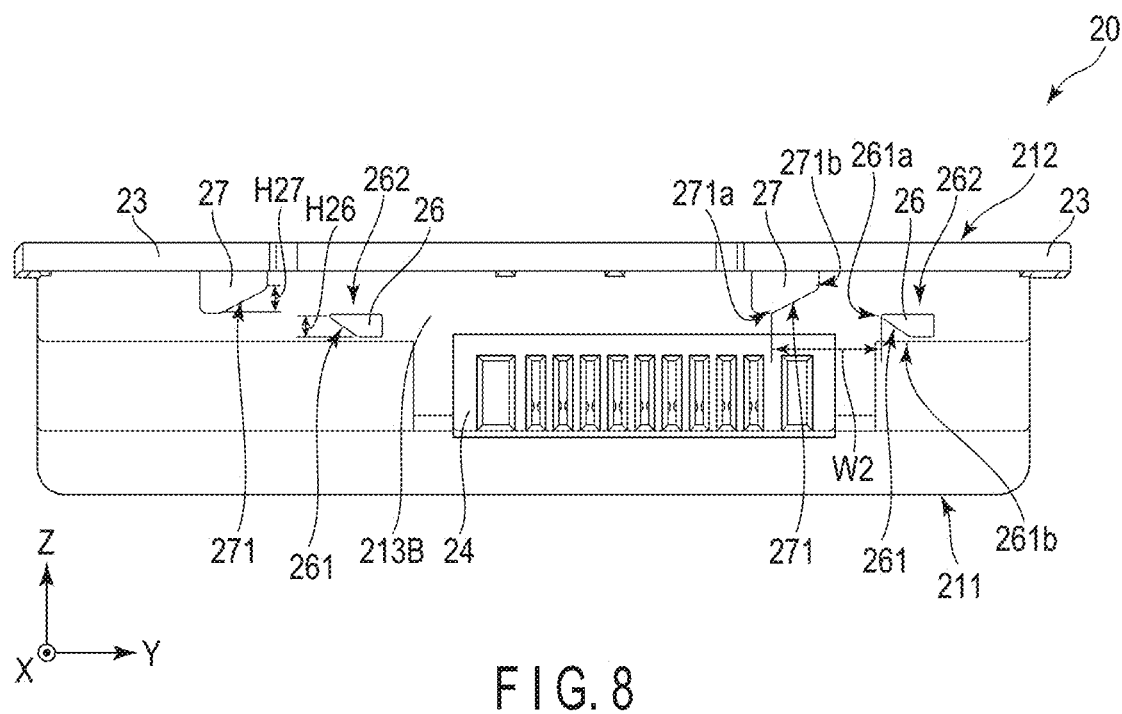
FIG. 8 is a side view of the battery pack shown in FIG. 6 and FIG. 7.
Figure 9:
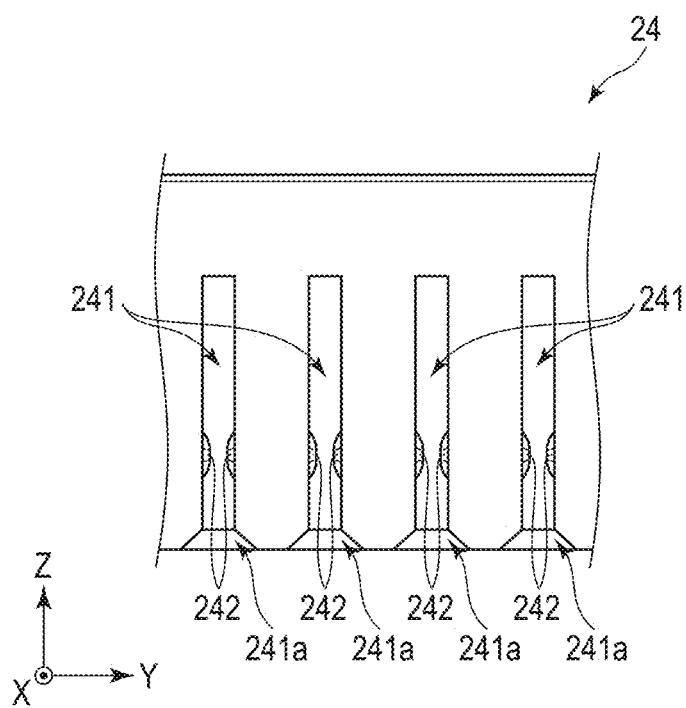
FIG. 9 is partial enlarged view showing a part of a second connector shown in FIG. 8.

Each of FIG. 6 and FIG. 7 is a perspective view of the battery pack 20 shown in FIG. 3. FIG. 8 is a side view of the battery pack 20 shown in FIG. 6 and FIG. 7. FIG. 9 is a partial enlarged view showing a part of the second connector 24 shown in FIG. 8.

In FIG. 6, the face 213B side of the battery pack 20 is mainly shown and, in FIG. 7, the face 213A side of the battery pack 20 is mainly shown. In FIG. 8, the second connector 24 side of the battery pack 20 is shown. In FIGS. 6 to 9, the X direction, Y direction, and Z direction are shown with the direction in which the battery pack 20 is installed into the mounting part 30 as shown in FIG. 3 used as the criterion.

As described above, on the face 213B side, the second connector 24 is provided. It should be noted that when the battery pack 20 is installed into the mounting part 30, the face 213B is opposed to the sidewall 341. As shown in FIG. 6, on the face 213B, pairs of protrusions 26 and 27 are provided. The pair of protrusions 26 is an example of a third protrusion, and pair of protrusions 27 is an example of a second protrusion. Hereinafter, the pair of protrusions 26 is collectively called the "protrusion 26", and pair of protrusions 27 is collectively called the "protrusion 27".

The protrusions 26 and 27 are provided on the battery pack 20 so ds to protrude from the face 213B. The protrusions 26 and 27 protrude farther in the X direction than the second connector 24. For example, the protrusion lengths of the protrusions 26 and 27 in the X direction are approximately equal to each other.

As shown in FIG. 7, on the face 213A, a pair of catches 28 is provided. By inserting the pair of catches 28 into the concave parts 34a in the inner wall 34, the user can position the battery pack 20 to the inserting part 30. The catch 28 is formed slightly smaller than the concave part 34a. The pair of catches 29 constitutes the detaching/attaching mechanism 110 together with the protrusions 26 and 27.

Next, the protrusions 26 and 27 constituting the detaching/attaching mechanism 110 will be described. As shown in FIG. 8, each of the protrusions 26 and 27 is constituted of two protrusions arranged in the Y direction. The protrusions 26 and 27 are positioned on the principal surface 212 side of the second connector 24. Each of the protrusions 26 and protrusions 27 protrudes from the face 213B at positions separate from each other in the Y direction and Z direction.

From another point of view, the protrusion 27 does not overlap the protrusion 26 in both the Y direction and Z direction.

In the example shown in FIG. 8, the protrusion 26 is shifted from the protrusion 27 in the Y direction. The protrusion 27 is positioned on the principal surface 212 side of the protrusion 26. When the battery pack 20 is installed into the mounting part 30, the protrusion 27 is positioned on the installation open end 32 side of the protrusion 26.

Next, the shape of the protrusion 26 will be described. The protrusions 26 each have the same shape, and hence the protrusion 26 on one side (right side in FIG. 8) will mainly be described.

The protrusion 26 protrudes from the face 213B in a form of a prismatic column, and includes a plurality of faces. The protrusion 26 includes an abutting face 261 (fourth abutting face) and engaging face 262 connected to the abutting face 261. When the operating lever 40 is moved in the sliding direction, the abutting face 261 abuts on the abutting face 432 of the protrusion 43. The engaging face 262 is opposed to the flange part 23. The engaging face 262 is engaged with the engaging face 434 of the protrusion 43 in the locked state.

The abutting face 261 includes an end part 261a on one end side thereof in the Y direction and end part 261b on the other end side in the Y direction. The abutting face 261 is contiguous to the engaging face 262 at the end part 261a. The engaging face 262 is a face approximately parallel to the X direction and Y direction. The abutting face 261 is an inclined face. As shown in FIG. 8, the abutting face 261 is inclined in such a direction that the abutting face 261 becomes gradually farther from the engaging face 262 and principal surface 212 from the end part 261a toward the end part 261b.

From another point of view, the length from the end part 261a to the principal surface 212 in the Z direction is less than the length from the end part 261b to the principal surface 212 in the Z direction. The abutting face 261 is inclined at an angle approximately equal to, for example, the abutting face 432.

Next, the shape of the protrusion 27 will be described. The protrusions 27 each have the same shape, and hence the protrusion 27 on one side (right side in FIG. 8) will mainly be described.

The protrusion 27 is positioned immediately under the flange part 23. As described above, the protrusion 27 is separate from the protrusion 26 in both the Y direction and Z direction. The protrusion 27 protrudes from the face 213B in a form of a prismatic column, and includes a plurality of faces. The protrusion 27 includes an abutting face 271 (third abutting face). When the operating lever 40 is moved in the sliding direction, the abutting face 271 abuts on the abutting face 431 of the protrusion 43.

The abutting face 271 includes an end part 271a on one end side thereof in the Y direction and end part 271b on the other end side in the Y direction. In the Y direction, the end part 271b is positioned on the end part 261a side of the end part 271a. The abutting face 271 is an inclined face. As shown in FIG. 6, the abutting face 271 is inclined in such a direction that the abutting face 271 becomes gradually farther from the principal surface 212 from the end part 271b toward the end part 271a.

From another point of view, the length from the end part 271b to the principal surface 212 in the Z direction is less than the length from the end part 271a to the principal surface 212 in the Z direction. The abutting face 271 is inclined at an angle approximately equal to, for example, the abutting face 431. The abutting face is inclined at an angle approximately equal to, for example, the abutting face 261. It should be rioted that the abutting face 271 may also be inclined at an angle different from the abutting face 261.

Here, the length from the end part 261b to the end part 261a in the Z direction is set as the height H26 of the abutting face 261, and length from the end part 271a to the end part 271b in the Z direction is set as the height H27 of the abutting face 271. The length from the end part 261a to the end part 271a in the Y direction is set as the width W2.

As an example, the height H26 is approximately equal to the height H27, and height H26 is approximately equal to the height H43. That is, the heights H43, H26, and H27 are approximately equal to each other. The protrusion 26 is separate from the protrusion 27 in the Y direction in such a manner that the width W2 becomes greater than the width W43.

The interval between the protrusions 26 in the Y direction is approximately equal to the interval between the protrusions 27 in the Y direction. The interval between the protrusions 26 in the Y direction is approximately equal to the interval between the protrusions 43 in the Y direction. That is, the interval between the protrusions 26 in the Y direction, interval between the protrusions 27 in the Y direction, and interval between the protrusions 43 in the Y direction are approximately equal to each other.

More specifically, the protrusions 26, 27, and 43 are provided in such a manner that the interval between the abutting faces 271 of the protrusions 27 in the Y direction becomes approximately equal to the interval between the abutting faces 431 of the protrusions 43 in the Y direction, and interval between the abutting faces 261 of the protrusions 26 in the Y direction becomes approximately equal to the interval between the abutting faces 432 of the protrusions 43 in the Y direction.

As shown in FIG. 9, the second connector 24 includes a plurality of slot-like connecting terminals 241 arranged in the Y direction, and protrusions 242 provided on the inner faces of each of the connecting terminals 241. Into the connecting terminals 241, the connecting terminals 511 of the first connector 51 are inserted. The protrusion 242 is a contact point for electrical contact with the connecting terminal 511. The protrusion 242 constitutes, for example, a leaf spring.

As shown in FIG. 9, the protrusions 242 are formed within the range from, for example, the central part of the connecting terminal 241 in the Z direction to the insertion open end 241a. For example, the protrusions 242 are formed in the vicinity of the insertion open end 241a. Between the protrusions 242 opposed to each other, a gap is formed. When the battery pack 20 is installed into the mounting part 30, the connecting terminals 511 are inserted into the connecting terminals 241. The thickness of the connecting terminal 511 is greater than the gap described above, and hence when the connecting terminal 511 is inserted into the connecting terminal 241, the gap is widened.

At this time, the second connector 24 generates elastic force at the protrusions 242 of each of the connecting terminals 241 so as to laterally apply the force to the connecting terminal 511 from both sides. The protrusions 242 hold the connecting terminal 511 between them by the elastic force, whereby the second connector 24 is electrically connected to the first connector 51.

Next, the process of detaching the battery pack 20 from the mounting part 30 by means of the detaching/attaching mechanism 110 included in the electronic device 100 will be described. By moving the operating lever 40 in the sliding direction, the detaching/attaching mechanism 110 can lift the battery pack 20 up from the mounting part 310.

Figure 10:
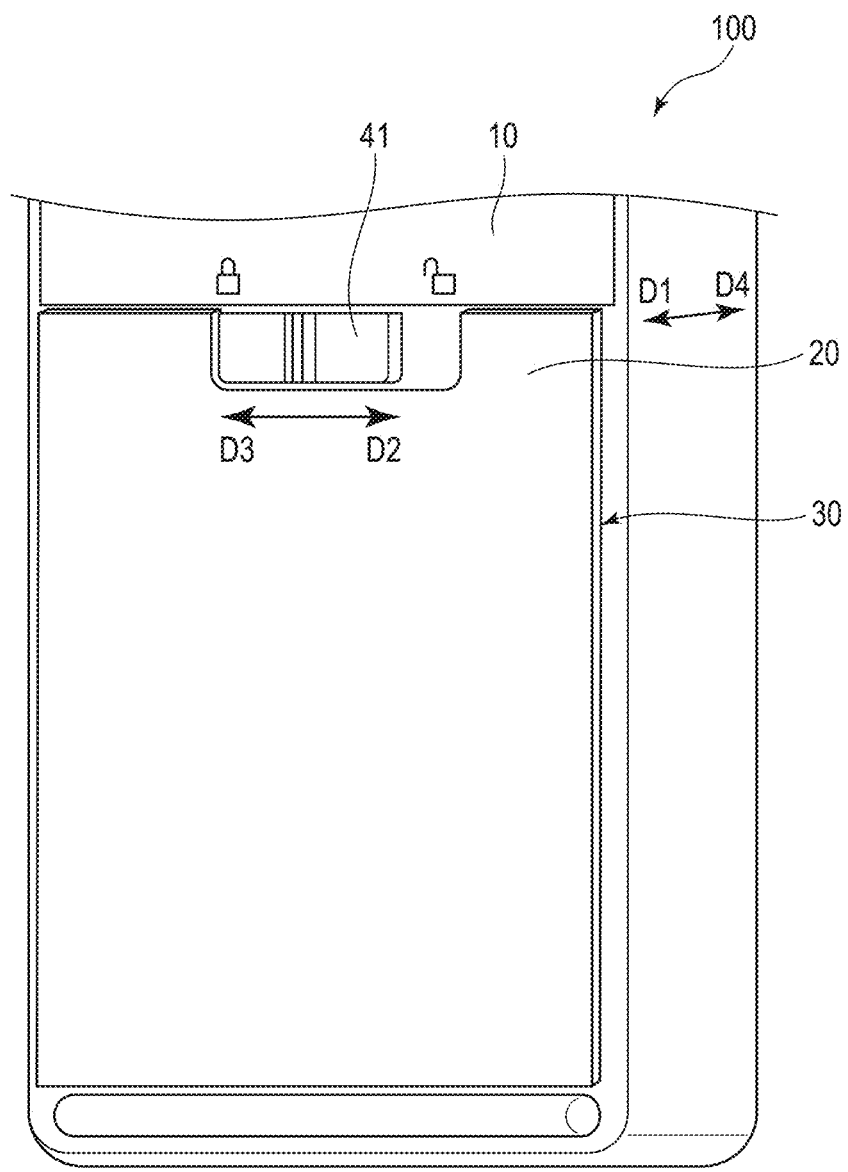
FIG. 10 is a view for explaining the process of detaching the battery pack by means of a detaching/attaching mechanism.
Figure 11:
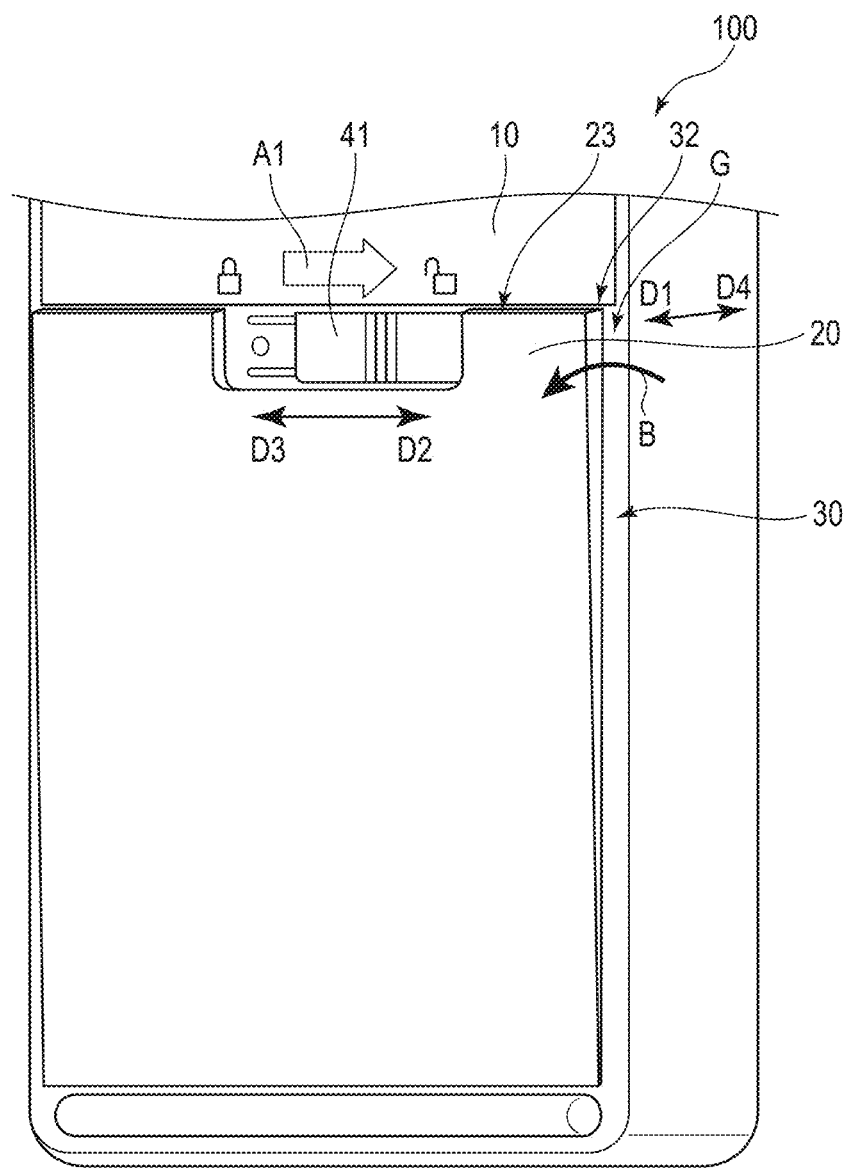
FIG. 11 is a view for explaining the process of detaching the battery pack by means of the detaching/attaching mechanism.
Figure 12:
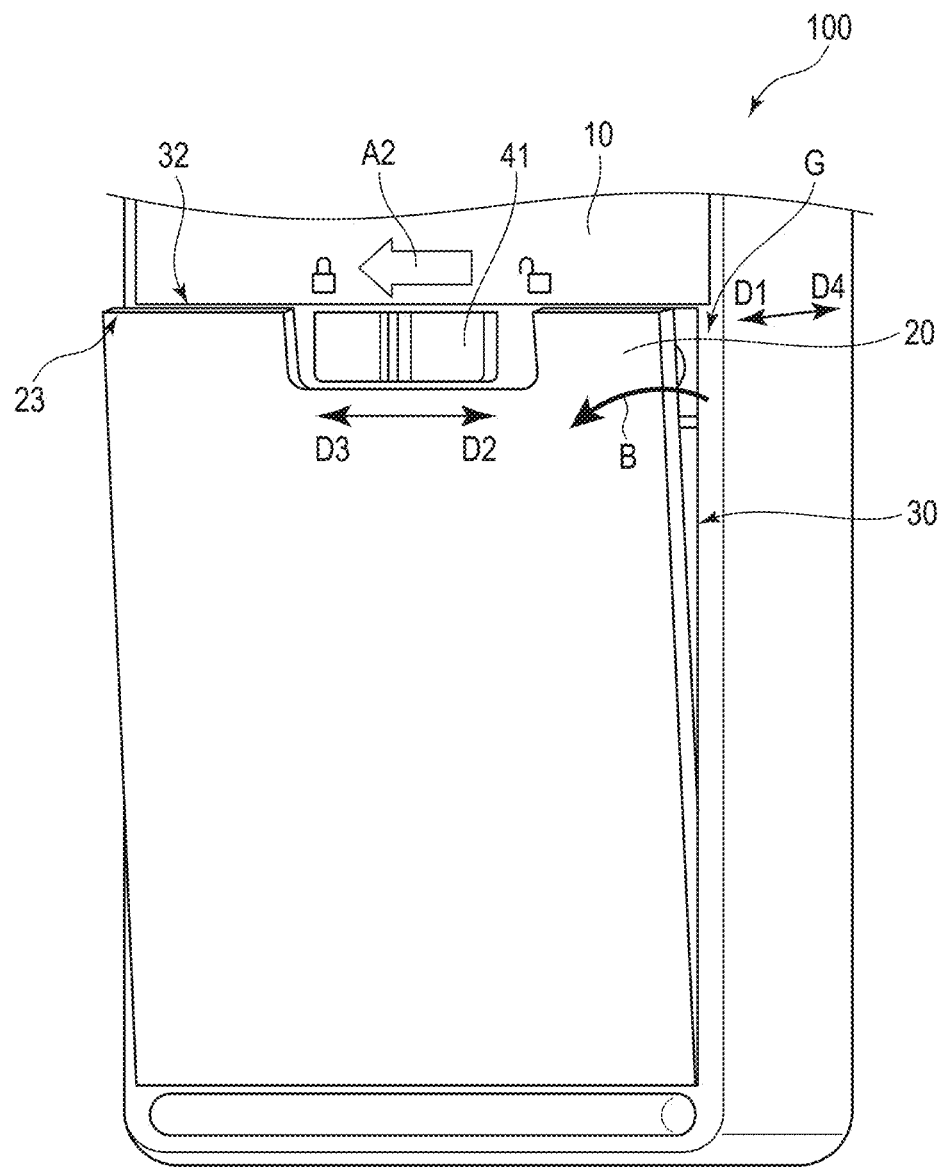
FIG. 12 is a view for explaining the process of detaching the battery pack by means of the detaching/attaching mechanism.

FIGS. 10 to 17 are views for explaining the process of detaching the battery pack 20 by means of the detaching/attaching mechanism 110. FIG. 18 is a view schematically showing the positional relationships between the protrusions 26, 27, and 43 shown in FIG. 13. In FIGS. 10 to 12, the process of detaching the battery pack 20 is viewed from the rear surface side. In FIGS. 13 to 17, the process of detaching the battery pack 20 is viewed at the cross section of the electronic device 100. In FIG. 18, the vicinity of the opening 38 on one side is shown.

In FIG. 10 and subsequent figures, regarding the direction in which the battery pack 20 is moved relatively to the mounting part 30, there is sometimes a case where the Z direction is set as the first direction D1, and direction opposite to the first direction D1 is called the fourth direction D4. The first direction D1 corresponds to the direction in which the battery pack 20 is detached from the mounting part 30, and fourth direction D4 corresponds to the direction in which the battery pack 20 is attached to the mounting part 30.

Regarding the sliding direction of the operating lever 40, there is sometimes a case where the direction opposite to the Y direction is set as the second direction D2, and Y direction is called the third direction D3. The second direction D2 is a direction different from the first direction D1. In the example shown, the second direction D2 and third direction D3 are directions orthogonal to the first direction D1 and fourth direction D4.

In FIG. 10, a state corresponding to the aforementioned locked state where the battery pack 20 is installed in the mounting part 30 is shown. In the locked state, the operating knob 41 of the operating lever 40 can be moved in the second direction D2.

Next, the operating knob 41 is moved in the second direction D2 as indicated by an arrow A1 in FIG. 11. When the operating knob 41 is moved in the second direction D2 from the locked state shown in FIG. 10, the face 213B side of the battery pack 20 is moved in the first direction D1 relatively to the mounting part 30 as indicated by an arrow B. Thereby, a gap G is formed between the installation open end 32 of the mounting part 30 and flange part 23 of the battery pack 20. Hereinafter, this state is called the "half-released state".

Furthermore, the operating knob 4 is moved in the third direction D3 as indicated by an arrow A2 in FIG. 12. When the operating knob 41 is moved in the third direction D3 from the half-released state shown in FIG. 11, the face 213B side of the battery pack 20 is further moved in the first direction D1 relatively to the mounting part 30 as indicated by the arrow B. Thereby, the gap G becomes further larger.

Accordingly, by hooking the user's finger at the widened gap G, the user can detach the battery pack 20 from the mounting part 30. In FIG. 12, the state corresponding to the aforementioned released state is shown. The position of the operating knob 41 relative to the housing 10 shown in FIG. 12 is identical to the position of the operating knob 41 relative to the housing 10 shown in, for example, FIG. 10.

Next, the detaching/attaching mechanism 110 in the process of detaching the battery pack 20 will further be described by using FIGS. 13 to 17.

Figure 13:
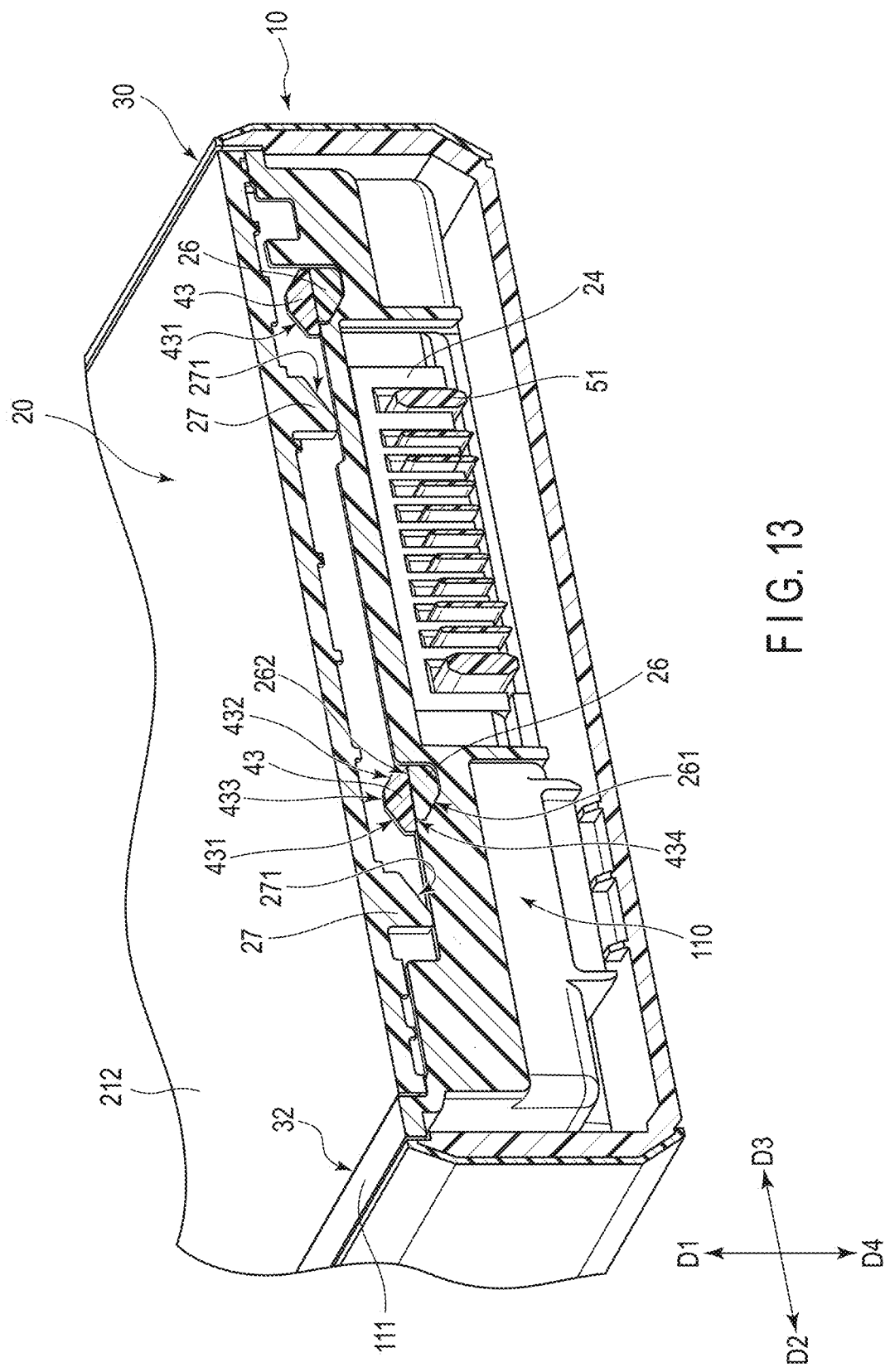
FIG. 13 is a view for explaining the process of detaching the battery pack by means of the detaching/attaching mechanism.
Figure 19:
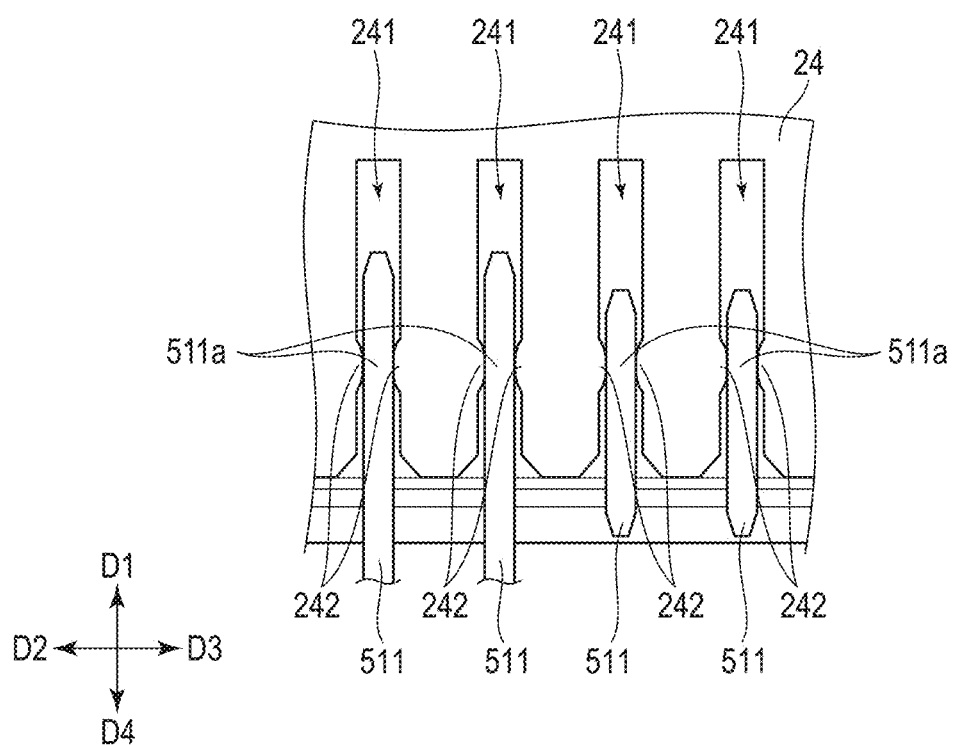
FIG. 19 is a view schematically showing a positional relationship between the first connector and second connector shown in FIG. 15.

In FIG. 13, the state corresponding to the locked state described by using FIG. 10 is shown. As shown in FIG. 13 and FIG. 19, the protrusion 26 is separate from the protrusion 27 in the first direction D1 and second direction D2. The abutting face 431 is opposed to the abutting face 271 with an interval held between them in the second direction D2. From another point of view, when the protrusion 43 is moved in the second direction D2, the abutting face 431 abuts on the abutting face 271. That is, the abutting face 271 is provided at such a position that the abutting face 271 can abut on the abutting face 431 when the operating lever 40 is moved in the second direction D2.

Figure 15:
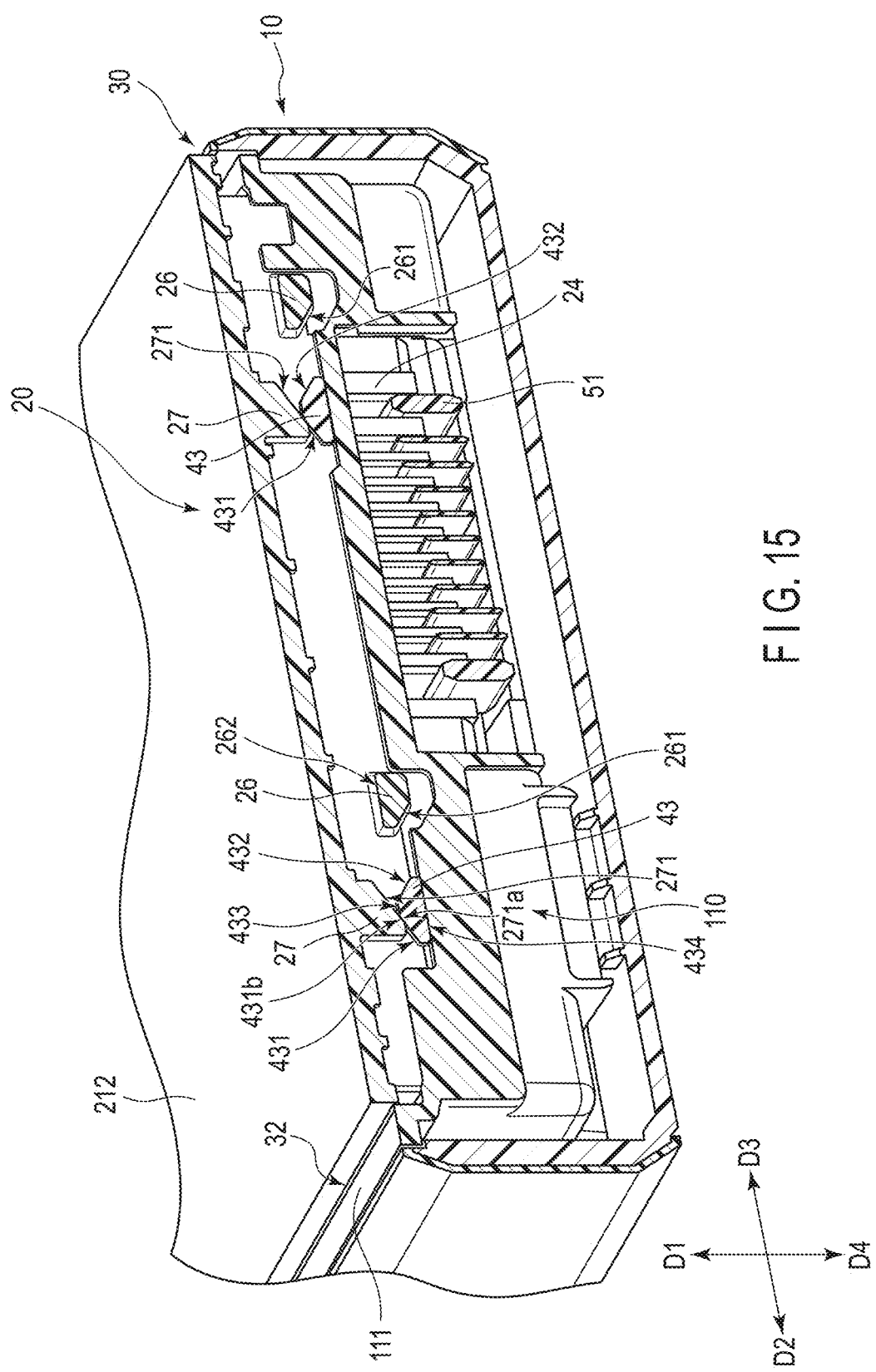
FIG. 15 is a view for explaining the process of detaching the battery pack by means of the detaching/attaching mechanism.

As shown in FIG. 15, in the locked state, the protrusion 26 is positioned in the concave part 381 of the opening 38. The protrusion 26 is formed slightly smaller than the concave part 381. As shown in FIG. 13 and FIG. 18, the protrusion 43 overlaps the protrusion 26 in the first direction D1. More specifically, the engaging face 262 is opposed to the engaging face 434. In the examples shown in FIG. 13 and FIG. 18, the engaging face 262 abuts on the engaging face 434.

At this time, when the protrusion 26 is to be moved in the first direction D1, the engaging face 262 is engaged with the engaging face 434, and hence the protrusion 26 cannot be moved in the first direction D1. Accordingly, in the locked state, the battery pack 20 cannot be detached from the mounting part 30 in the first direction D1.

That is, as shown in FIG. 13 and FIG. 18, in the state where the battery pack 20 is installed in the mounting part 30, the operating lever 40 is moved to such a position that the engaging face 262 and engaging face 434 are opposed to each other, whereby the protrusion 43 restrains the battery pack 20 from being moved in the first direction D1 relatively to the housing 10.

Next, when the operating knob 41 is moved in the second direction D2, the protrusion 43 protruding from the main body part 42 is moved in the second direction D2. As described above, the abutting face 431 and abutting face 271 are inclined. The abutting face 431 and abutting face 271 are inclined in such a manner that the positions of the face 43 and face 271 change in the fourth direction D4 with an advance in the second direction D2. From another point of view, the protrusion 43 and protrusion 27 each have such shapes that the sum of the thicknesses of the protrusion 43 and protrusion 27 at the abutting position located on the farthermost third direction D3 side within such a region that the protrusion 43 and protrusion 27 abut on each other gradually increases with an advance in the second direction D2. It should be note that the term "thickness" mentioned here implies the dimension of the protrusion 43 including the abutting face 431 in the Z direction and dimension of the protrusion 27 including the abutting face 271 in the Z direction. Accordingly, the battery pack 20 is moved in the direction in which the battery pack 20 is separated away from the installation open end 32.

When the protrusion 43 is moved in the second direction D2, the protrusion 43 is positioned on the fourth direction D4 side of the protrusion 27. The abutting face 43 abuts on the abutting face 271. The end part 431a is positioned in the vicinity of the end part 271a, and end part 431b is positioned in the vicinity of the end part 271b.

The abutting face 431 and abutting face 271 are inclined at approximately the same angle, and hence the abutting face 43 abuts on approximately the whole of the abutting face 271. The interval between the abutting faces 271 is approximately equal to the interval between the abutting faces 431, and hence the abutting faces 271 simultaneously abut on the opposed abutting faces 431.

The aforementioned width W2 is formed larger than the width W43 of the protrusion 43, and hence when the protrusion 43 is moved to the position shown in FIG. 14 from the locked state, the protrusion 26 does not overlap the protrusion 43 in the first direction D. From another point of view, the engaging face 262 is not opposed to the engaging face 434. When the protrusion 26 is moved in the first direction D1, the engaging face 262 is not engaged with the engaging face 434, and hence movement of the battery pack 20 in the first direction D1 is not restrained by the protrusion 43.

When the protrusion 43 is further moved in the second direction D2, the abutting face 431 is slid along the abutting face 271. The abutting face 431 and abutting face 271 are inclined as described above, and hence when the abutting face 431 is slid from the end part 271b side to the end part 27a side, the abutting face 271 is pushed by the abutting face 431 in the first direction D1. At this time, the battery pack 20 including the protrusions 26 and 27 is gradually moved in the first direction D1 with the movement of the protrusion 43 in the second direction D2. From another point of view, the relative positions of the protrusion 43 and protrusion 27 in the first direction D1 are changed.

As described above, the abutting faces 271 simultaneously abut on the opposed abutting faces 431, and hence the abutting faces 271 are simultaneously pushed by the abutting faces 431 in the first direction D1, whereby the protrusions 27 are simultaneously moved in the first direction D1. At this time, the movement of the protrusion 26 in the first direction D1 is not restrained by the protrusion 43, and hence the protrusion 26 is moved from the concave part 381 in the first direction D1.

Accordingly, when the operating lever 40 is moved in the second direction D2 from the state where the battery pack 20 is installed in the mounting part 30 as shown in FIG. 13, the relative positions of the protrusion 43 and protrusion 27 in the first direction D1 are changed in the first direction with the movement of the operating lever 40 in the second direction D2. It can be said that the abutting face 431 and abutting face 271 are inclined in such a manner that the relative positions of the protrusion 43 and protrusion 27 in the first direction D1 are changed when the operating lever 40 is moved in the second direction D2.

When the protrusion 43 is further moved in the second direction D2, the protrusion 43 is moved to the position at which the end part 43b and end part 271a abut on each other. The protrusion 43 overlaps the protrusion 27 in the first direction D1. Hereinafter, regarding the operating lever 40 as an example, the position at which the end part 431b and end part 271a abut on each other is called the "first position". As another example, regarding the operating lever 40, the first position is the position at which the abutting face 431 and abutting face 271 abut on each other at least at a part.

In FIG. 15, the state corresponding to the half-released state described by using FIG. 11 is shown. When the protrusion 43 is moved in the second direction D2 until the end part 431b and end part 271a abut on each other, the battery pack 20 is moved in the first direction D1 relatively to the mounting part 30 by a distance corresponding to the height H27 of the abutting face 271. At this time, a gap G is formed between the installation open end 32 of the mounting part 30 and flange part 23 of the battery pack 20.

The protrusion 26 has already moved from the concave part 381 in the first direction D1, and hence the abutting face 432 is opposed to the abutting face 261 with an interval held between them in the third direction D3 as shown in FIG. 15. From another point of view, when the protrusion 43 is moved in the third direction D3, the abutting face 432 abuts on the abutting face 261. That is, the abutting face 261 is provided at such a position that the abutting face 261 can abut on the abutting face 432 when the operating lever 40 is moved from the first position in the third direction D3.

Here, the positional relationship between the first connector 51 and second connector 24 in the half-released state will be described. FIG. 19 is a view schematically showing the positional relationship between the first connector 51 and second connector 24 shown in FIG. 15. As described above by using FIG. 9, the protrusions 242 hold the connecting terminal 511 between them, whereby the connecting terminal 241 of the second connector 24 is electrically connected to the connecting terminal 511.

In the half-released state, the second connector 24 is moved in the first direction D1 by the movement of the battery pack 20 from the locked state. At this time, the tip end part 511a of the connecting terminal 511 is held between the protrusions 242, whereby the first connector 51 is caught by the elastic force of the second connector 24 at only each of the tip end parts 511a thereof. The tip end part 511a includes not only the tip end of the connecting terminal 511 but also the vicinity thereof.

More specifically, the elastic force of each of the protrusions 242 is exerted on the tip end part 511a of the connecting terminal 511 from each of the second direction D2 and third direction D3. In the half-released state, the connecting terminal 241 is electrically connected to the connecting terminal 511.

At this time, when the battery pack 20 is intended to be moved in the fourth direction D4, frictional force acts between the connecting terminal 511 and each protrusion 242 in the first direction D1. Only the tip end part 511a of the connecting terminal 511 is caught by the elastic force of the protrusions 242, whereby the movement of the battery pack 20 in the fourth direction D4 is restrained.

Accordingly, when the operating lever 40 is moved to the first position from the state where the battery pack 20 is installed in the mounting part 30, the battery pack 20 is hardly moved in the fourth direction D4 by the self-weight thereof, and it is possible to keep the position of the battery pack 20 while maintaining the gap G as it is. The amount of movement of the battery pack 20 from the locked state to the half-released state in the first direction D1 is set within such a range that the connecting terminal 511 is held between the protrusions 242.

Next, when the operating knob 41 is moved in the third direction D3 after being passed through the first position, the protrusion 43 is moved in the third direction D3. As described above, the abutting face 432 and abutting face 261 are inclined. The abutting face 432 and abutting face 261 are inclined in such a manner that the positions of the face 432 and face 261 change in the fourth direction D4 with an advance in the third direction D3. From another point of view, the protrusion 43 and protrusion 26 each have such shapes that the sum of the thicknesses of the protrusion 43 and protrusion 26 at the abutting position located on the farthermost second direction D2 side within the region in which the protrusion 43 and protrusion 26 abut on each other gradually increases with an advance in the third direction D3. It should be note that the term "thickness" mentioned here implies the dimension of the protrusion 43 including the abutting face 432 in the Z direction and dimension of the protrusion 26 including the abutting face 261 in the Z direction. Accordingly, the battery pack 20 is moved in the direction in which the battery pack 20 is separated away from the installation open end 32.

Figure 16:
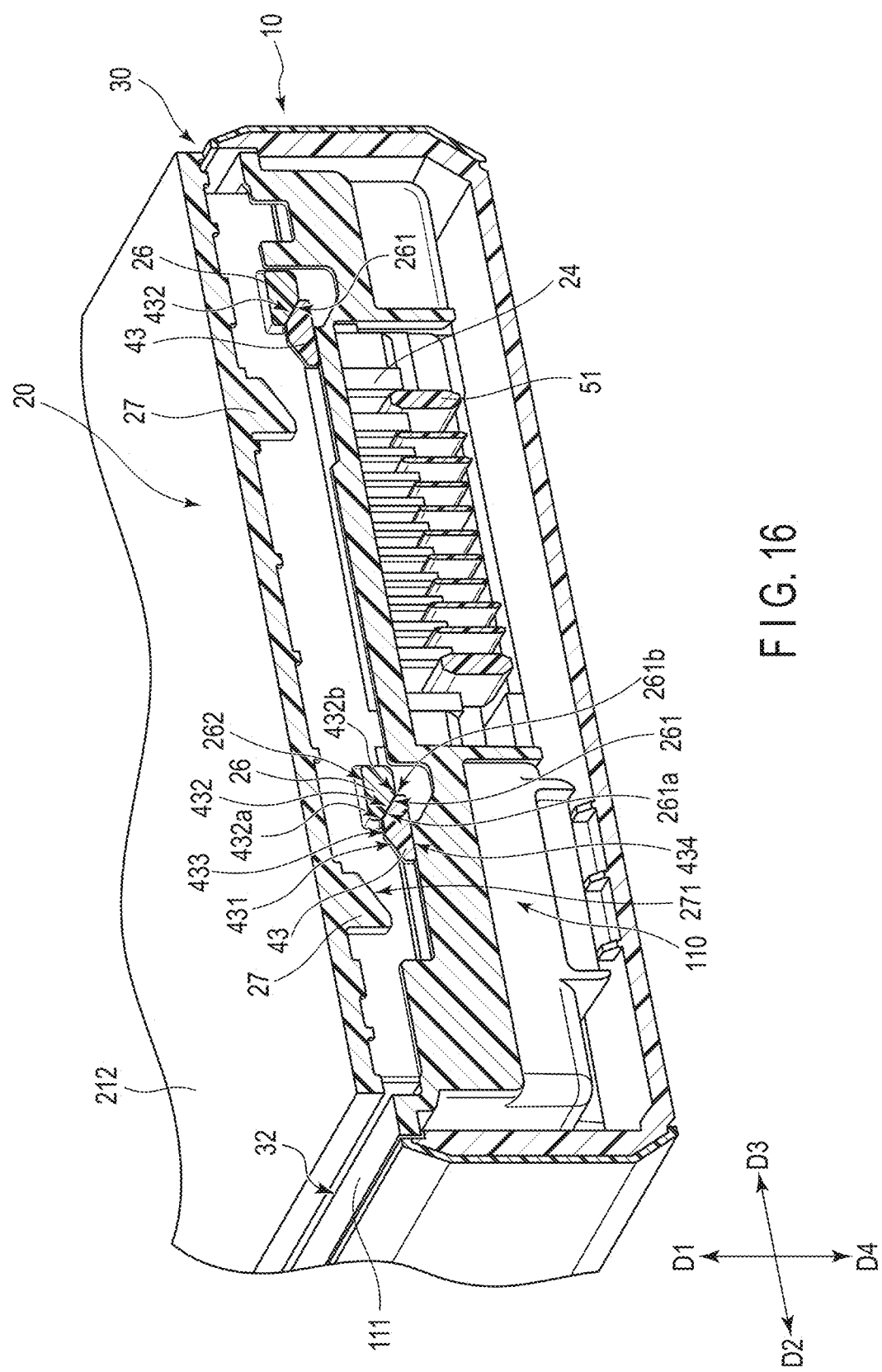
FIG. 16 is a view for explaining the process of detaching the battery pack by means of the detaching/attaching mechanism.

When the protrusion 43 is moved in the third direction D3 after being passed through the first position, the protrusion 43 is positioned on the fourth direction D4 side of the protrusion 26 as shown in FIG. 16. The abutting face 432 abuts on the abutting face 261. The end part 432a is positioned in the vicinity of the end part 261a, and end part 432b is positioned in the vicinity of the end part 261b.

The abutting face 432 and abutting face 261 are inclined at approximately the same angle, and hence the abutting face 432 abuts on approximately the whole of the abutting face 261. The interval between the abutting faces 261 is approximately equal to the interval between the abutting faces 432, and hence the abutting faces 261 simultaneously abut on the opposed abutting faces 432.

When the protrusion 43 is further moved in the third direction D3, the abutting face 432 is slid along the abutting face 261. The abutting face 432 and abutting face 26 are inclined as described above, and hence when the abutting face 432 is slid from the end part 261a side to the end part 261b side, the abutting face 261 is pushed by the abutting face 432 in the first direction D1. At this time, the battery pack 20 including the protrusions 26 and 27 is gradually moved in the first direction D1 with the movement of the protrusion 43 in the third direction D3.

From another point of view, the relative positions of the protrusion 43 and protrusion 26 in the first direction D1 are changed. As described above, the abutting faces 261 simultaneously abut on the opposed abutting faces 432, and hence the abutting faces 261 are simultaneously pushed by the abutting faces 432 in the first direction D1, whereby the protrusions 26 are simultaneously moved in the first direction D1.

Accordingly, when the operating lever 40 is moved in the third direction D3 after the battery pack 20 is moved in the first direction D1 relatively to the mounting part 30 by abutting of the abutting face 431 and abutting face 271 on each other as shown in FIG. 15, the relative positions of the protrusion 43 and protrusion 26 in the first direction D1 are changed in the first direction D1 with the movement of the operating lever 40 in the third direction. It can be said that the abutting face 432 and abutting face 261 are inclined in such a manner that the relative positions of the protrusion 43 and protrusion 26 in the first direction D1 are changed when the operating lever 40 is moved in the third direction D3.

Figure 17:
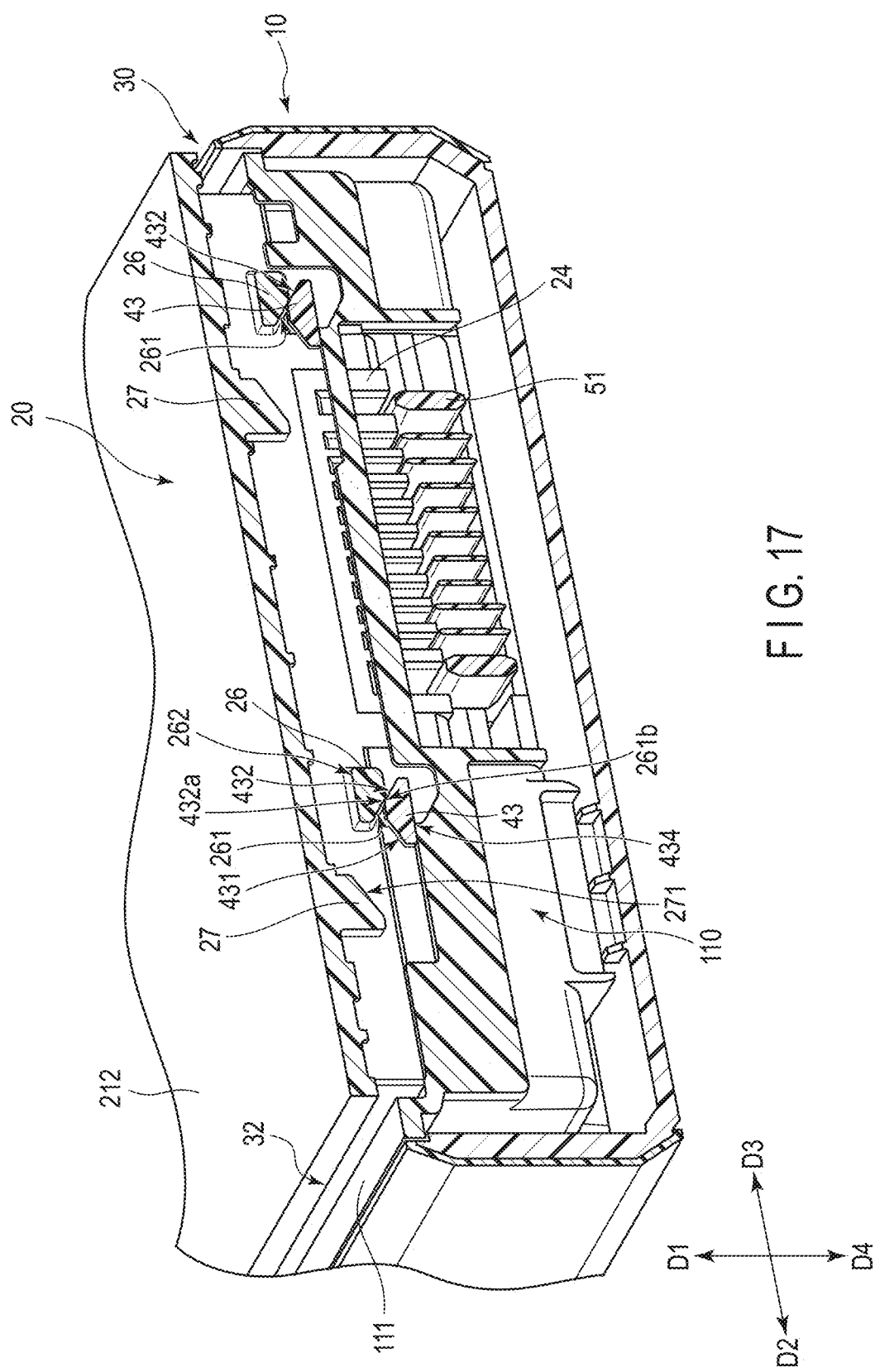
FIG. 17 is a view for explaining the process of detaching the battery pack by means of the detaching/attaching mechanism.
Figure 18:
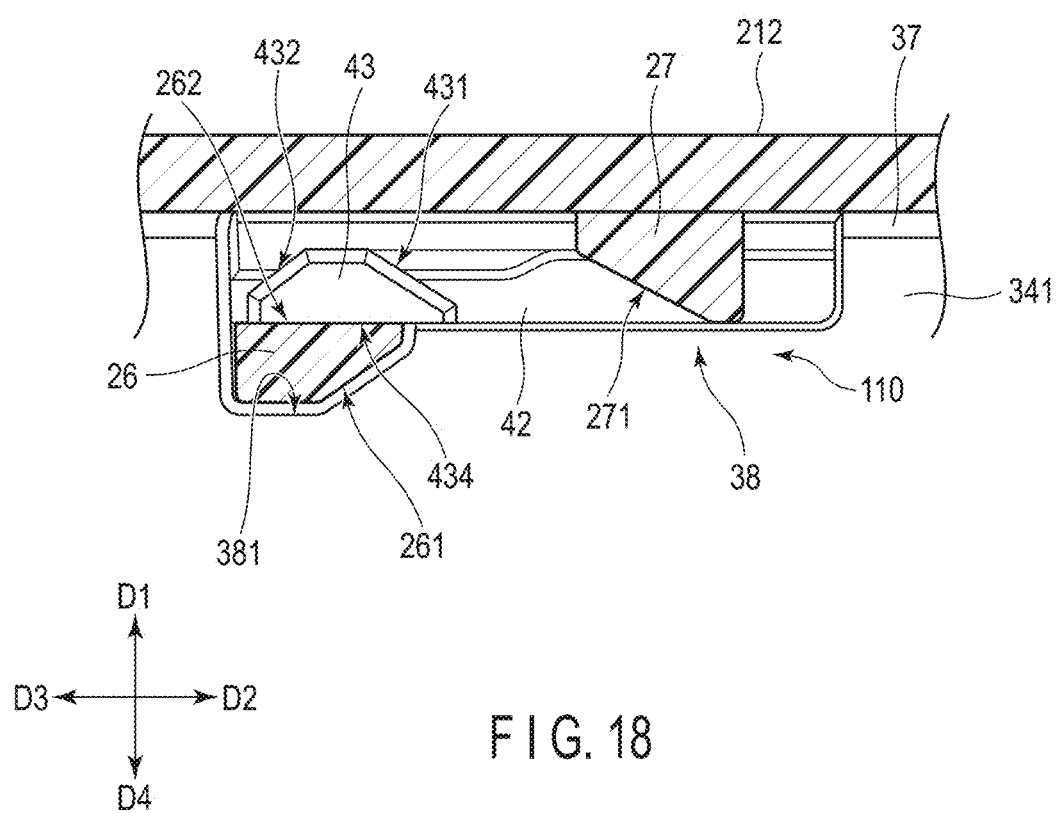
FIG. 18 is a view schematically showing positional relationships between the protrusions shown in FIG. 13.

When the protrusion 43 is further moved in the third direction D3, the protrusion 43 is moved to the position at which the end part 432a and end part 261b abut on each other as shown in FIG. 17. The protrusion 43 overlaps the protrusion 26 in the first direction D1. Hereinafter, regarding the operating lever 40 as an example, the position at which the end part 432a and end part 261b abut on each other is called the "second position". As another example, regarding the operating lever 40, the second position is the position at which the abutting face 432 and abutting face 261 abut on each other at least at a part.

The operating lever 40 can be moved between the first position and second position in the second direction D2 and third direction D3. The amount of movement of the operating lever 40 in the second direction D2 is approximately equal to, e.g., the amount of movement of the operating lever 40 in the third direction D3.

In FIG. 17, the state corresponding to the released state described above by using FIG. 12 is shown. When the protrusion 43 is moved in the third direction D3 until the end part 432a and end part 261b abut on each other, the battery pack 20 is moved from the half-released state in the first direction D1 relatively to the mounting part 30 by an amount corresponding to the height H26 of the abutting face 261. At this time, the gap G between the installation open end 32 of the mounting part 30 and flange part 23 of the battery pack 20 becomes further larger.

That is, the operating lever 40 is moved from the locked state in the second direction D2, is passed through the first position, and thereafter is moved in the third direction D3, whereby it is possible for the detaching/attaching mechanism 110 to move the face 213B side of the battery pack 20 in the first direction D1 relatively to the mounting part 30 by an amount corresponding to the sum of the height H26 and height H27.

In the released state, the first connector 51 is not electrically connected to the second connector 24. From another point of view, the connecting terminal 511 is not held between the protrusions 242 of the connector terminal 241.

The height H26 is approximately equal to the height H27, and hence the amount of movement of the battery pack 20 from the locked state to the half-released state in the first direction D1 is approximately equal to the amount of movement of the battery pack 20 from the half-released state to the released state in the first direction D1.

It should be noted that the height H26 of the abutting face 261 and height H27 of the abutting face 271 can appropriately be determined according to the amount of movement of the battery pack 20 in the first direction D1. The amount of movement of the battery pack 20 from the locked state to the half-released state in the first direction D1 may be greater than or less than the amount of movement of the battery pack 20 from the half-released state to the released state in the first direction D1.

When the battery pack 20 is to be installed into the mounting part 30, the battery pack 20 can be installed into the mounting part 30 by means of the detaching/attaching mechanism 110 by the process opposite to the aforementioned process. When installing the battery pack 20 into the mounting part 30, the user directs the battery pack 20 toward the installation open end 32 for insertion. The user inserts the pair of catches 28 of the battery pack 20 into the concave parts 34a in the inner wall 34 to thereby position the battery pack 20 to the mounting part 30.

This state corresponds to the released state described by using FIG. 12 and FIG. 17. The operating lever 40 is positioned at the second position. In the released state, the operating knob 41 of the operating lever 40 can be moved in the second direction D2.

Next, the user moves the operating knob 41 of the operating lever 40 to the first position while pushing the principal surface 212 of the battery pack 20 in the fourth direction D4. The abutting face 432 is slid along the abutting face 261 and protrusion 43 is moved in the second direction D2. The battery pack 20 is gradually moved in the fourth direction D4 with the movement of the protrusion 43 in the second direction D2.

Then, the half-released state described by using FIG. 11 and FIG. 15 is brought about. The operating lever 40 is positioned at the first position. At this time, the tip end part 511a of the connecting terminal 511 is held between the protrusions 242 as shown in FIG. 19.

Next, the user moves the operating knob 41 in the third direction D3 while pushing the principal surface 212 of the battery pack 20 in the fourth direction D4. The abutting face 431 is slid along the abutting face 271 and protrusion 43 is moved in the third direction D3. The battery pack 20 is gradually moved in the fourth direction with the movement of the protrusion 43 in the third direction D3.

Thus, the protrusion 26 is positioned in the concave part 381 of the opening 38. When the user further moves the operating knob 41 in the third direction D3, the protrusion 43 overlaps the protrusion 26 in the first direction D1, and the locked state described by using FIG. 11 and FIG. 13 is brought about.

According to the electronic device 100 in the first embodiment configured as described above, it is possible to detach the battery pack 20 from the mounting part 30 by means of the detaching/attaching mechanism 110. By moving the operating lever 40 from the locked state to the first position in the second direction D2, the battery pack 20 is moved in the first direction D1 relatively to the mounting part 30, and half-released state is obtained. At this time, it is possible to form the gap G between the installation open end 32 of the mounting part 30 and flange part 23 of the battery pack 20.

Then, by moving the operating lever 40 in the third direction D3 after passing through the first position, the battery pack 20 is further moved from the half-released state in the first direction D1 relatively to the mounting part 30, and released state is obtained. The gap G becomes larger than in the half-released state, and the user can hook the user's finger at the gap G. Accordingly, the user can easily detach the battery pack 20 from the mounting part 30 by hooking the user's finger at the gap G.

The abutting face 431 and abutting face 271 are inclined in such a manner that the relative positions of the protrusion 43 and protrusion 27 in the first direction D1 are changed when the operating lever 40 is moved in the second direction D2. Accordingly, when the operating lever 40 is moved from the state where the battery pack 2' is installed in the mounting part 30 in the second direction D2, it is possible to move the battery pack 20 in the first direction D1 relatively to the mounting part 30.

The abutting face 432 and abutting face 261 are inclined in such a manner that the relative positions of the protrusion 43 and protrusion 26 in the first direction D1 are changed when the operating lever 40 is moved in the third direction D3. Accordingly, when the operating lever 40 is moved in the third direction D3 after the battery pack 20 is moved in the first direction D1 relatively to the mounting part 30 by abutting of the abutting face 431 and abutting face 271 on each other, it is possible to move the battery pack 20 in the first direction D1 relatively to the mounting part 30.

In the detaching/attaching mechanism 110, when the operating lever 40 is moved in each of the second direction D2 and third direction D3, the battery pack 20 can be moved in the first direction D1. According to the detaching/attaching mechanism 110 described above, it is possible to secure the amount of movement of the operating lever in the sliding direction for moving the battery pack 20 in the first direction D1.

By securing the amount of movement of the operating lever 40 in the sliding direction, it is possible to sufficiently move the battery pack 20 in the first direction D1 relatively to the mounting part 30, and thus the gap G at which the user hooks the user's finger is formed. By securing the amount of movement of the operating lever 40 in the sliding direction as described above, it is possible to reduce the space for moving the operating lever 40 in the housing 10, and contribute to the downsizing of the housing 10.

The user can hook the user's finger at the gap G formed in the released state, and hence there is no need to provide a shape or the like at which the user hooks the user's finger on the external shape of the electronic device 100. Accordingly, it is possible to make each of the outer surface 111 of the housing 10 and principal surface 212 of the battery pack 20 have a flat shape.

Furthermore, each of the protrusions 26 and 27 is constituted of two protrusions arranged in the Y direction, and protrusion 43 is constituted of two protrusions arranged in the Y direction. The abutting faces 271 each simultaneously abut on the opposed abutting faces 431, and abutting faces 261 each simultaneously abut on the opposed abutting faces 432.

Accordingly, by the movement of the operating lever 40, it is possible to move the flange part 23 on the face 213B side in the first direction D1 while keeping the flange part 23 on the face 213B side in parallel with the sliding direction. The gap G approximately uniform relatively to the sliding direction is formed between the flange part 23 and installation open end 32, whereby the user can easily hook the user's finger at the gap G, and detachability/attachability of the electronic device 100 is further improved. In addition, the embodiment is not limited to the case where there are a plurality of protrusions 26, protrusions 27 and protrusions 43, but it may suffice if at least one protrusion 26, at least one protrusion 27 and at least one protrusion 43 are provided. Further, with protrusions 26, protrusions 27 and protrusions 43, even a mounting part with large dimensions can be locked or lifted using the multiple protrusions 26, 27, and 43, thereby making a detaching/attaching operation easier.

As described above, the abutting face 431 and abutting face 27 are inclined at approximately the same angle, whereby the abutting face 431 abuts on approximately the whole of the abutting face 271, and it becomes easy to move the operating lever 40 in the second direction D2 when the abutting face 431 is slid along the abutting face 271.

As described above, the abutting face 432 and abutting face 261 are inclined at approximately the same angle, whereby the abutting face 432 abuts on approximately the whole of the abutting face 261, and it becomes easy to move the operating lever 40 in the third direction D3 when the abutting face 432 is slid along the abutting face 261. It should be noted that the angle at which each of the abutting faces 431, 432, 261, and 271 is inclined can appropriately be determined.

Furthermore, while the first connector 51 and second connector 24 are electrically connected to each other, the protrusions 242 or each of the connecting terminals 241 of the second connector 24 generate elastic force so as to laterally apply the force to each of the connecting terminals 511 from both sides. In the half-released state, the tip end part 511a of each of the connecting terminals 511 of the first connector 51 is held between the protrusions 242, and hence the position of the battery pack 20 can be maintained.

The amount of movement of the battery pack 20 from the locked state to the half-released state in the first direction D1 is set within such a range that the connecting terminal 511 is held between the protrusions 242. Accordingly, it is possible to move the battery pack 20 in the first direction D1 according to the amount of movement of the operating lever 40 in the second direction D2, and thus the amount of movement of the operating lever 40 in the second direction D2 does not come to nothing.

Furthermore, in the locked state, the protrusion 43 overlaps the protrusion 26 in the first direction D1. At this time, the engaging face 434 of the protrusion 43 is opposed to the engaging face 262 of the protrusion 26. When the protrusion 26 is intended to be moved in the first direction D1, the engaging face 262 is engaged with the engaging face 434, and hence the protrusion 26 cannot be moved in the first direction D1. Accordingly, in the detaching/attaching mechanism 110, the protrusion 43 fulfills the role of restraining the movement of the battery pack 20 in the first direction D1 relative to the mounting part 30.

According to the first embodiment described above, it is possible to provide an electronic device 100 capable of improving the detachability/attachability of the installation component such as the battery pack 20 or the like. It should be noted that although the abutting face 431 and abutting face 271 are each inclined, it is sufficient if at least one of the faces 431 and 271 is inclined. Although the abutting face 432 and abutting face 261 are each inclined, it is sufficient it at least one of the faces 432 and 261 is inclined.

It should be noted that the amount of movement of the operating lever 40 in the sliding direction (second direction D2 and third direction D3) can appropriately be determined according to the abutting faces 261 and 271. The amount of movement of the operating lever 40 in the second direction D2 may differ from, for example, the amount of movement of the operating lever 40 in the third direction D3.

It should be noted that although each of the protrusions 26 and 27 is constituted of two protrusions arranged in the Y direction, each of the protrusions 26 and 27 may be constituted of one protrusion or may be constituted of three or more protrusions. In this case, the number of the protrusions 43 is appropriately changed according to the numbers of the protrusions 26 and 27.

It should be noted that although in this embodiment, the example in which the first connector 51 is a male connector, and second connector 24 is a female connector has been disclosed, the first connector 51 may be a female connector and second connector may be a male connector.

It should be noted that it is sufficient in the half-released state, if at least one of the connecting terminals 511 is held in one connecting terminal 241, and in the half-released state, connecting terminals 511 each of which is not held in a connecting terminal 241 may be present among the connecting terminals 511.

Second Embodiment

Figure 21:
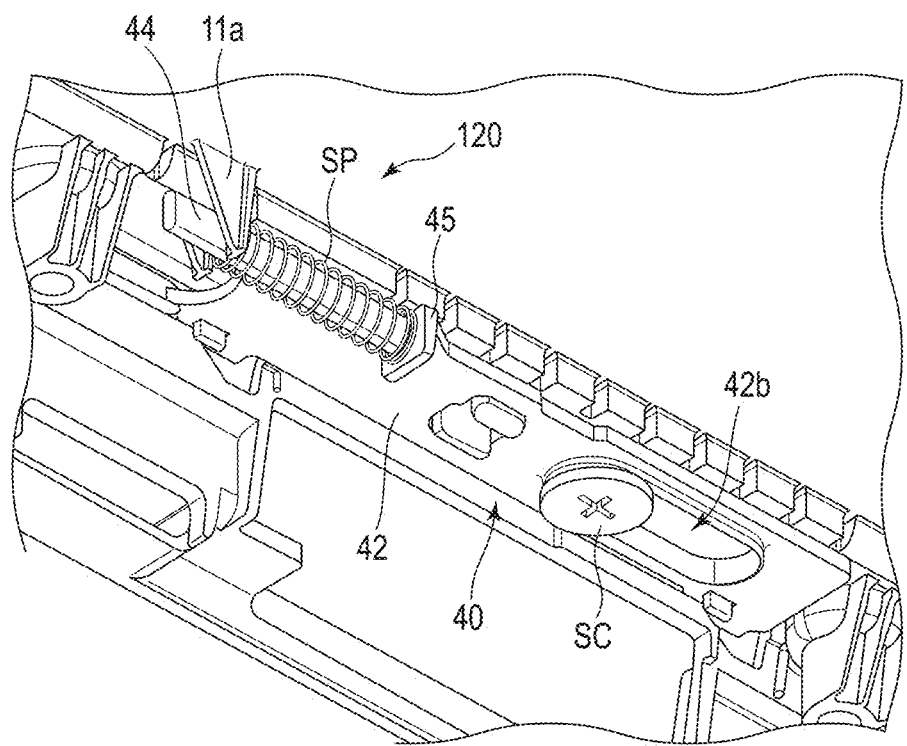
FIG. 21 is a view showing a state where the operating lever shown in FIG. 20 is provided in the housing.

Next, a second embodiment will be described. Constituent elements identical to the first embodiment are denoted by reference symbols identical to the first embodiment and descriptions of the elements are appropriately omitted. FIG. 20 is a perspective view of an operating lever 40 of an electronic device 100 in the second embodiment. FIG. 21 is a view showing a state where the operating lever 40 shown in FIG. 20 is provided in a housing 10.

In FIG. 21, a main body part 42 of the operating lever 40 is viewed from the inside of the housing 10. The electronic device 100 of the second embodiment differs from the electronic device 100 of the first embodiment in that the detaching/attaching mechanism 110 includes a holding mechanism.

As shown in FIG. 20 and FIG. 21, the operating lever 40 constituting the detaching/attaching mechanism 110 includes a coil spring SP. The coil spring SP is an example of an energizing member constituting the holding mechanism 120 included in the detaching/attaching mechanism 110. The main body part 42 includes an extension part 44 extending in the direction opposite to the Y direction, and receiving part 45 provided at a base end of the extension part 44.

As shown in FIG. 21, inside the housing 10, the coil spring SP is positioned between the receiving part 45 and receiving part 11a provided inside the housing 10. The receiving part 11a includes a gap in which the extension part 44 can be moved. Both ends of the coil spring SP are respectively in contact with the receiving parts 45 and 11a.

The coil spring SP extends inside the housing 10 in the Y direction. Inside the opening 42b of the main body part 42, a screw SC is provided. The main body part 42 is movably held inside the housing 10 by the opening 42b and screw SC.

In FIG. 21, the state corresponding to the locked state described by using, for example, FIG. 10 and FIG. 13 is shown. In the state where the battery pack 20 is installed in the mounting part 30, the coil spring SP is compressed from the free length. From another point of view, the interval between the receiving part 45 and receiving part 11a is set in such a manner that the interval becomes less than the free length of the coil spring SP in the locked state. At this time, the coil spring SP energizes the main body part 42 of the operating lever 40 in the third direction D3. The holding mechanism 120 is constituted of, for example, the coil spring SP, extension part 44, receiving parts 45 and 11a.

Figure 22:
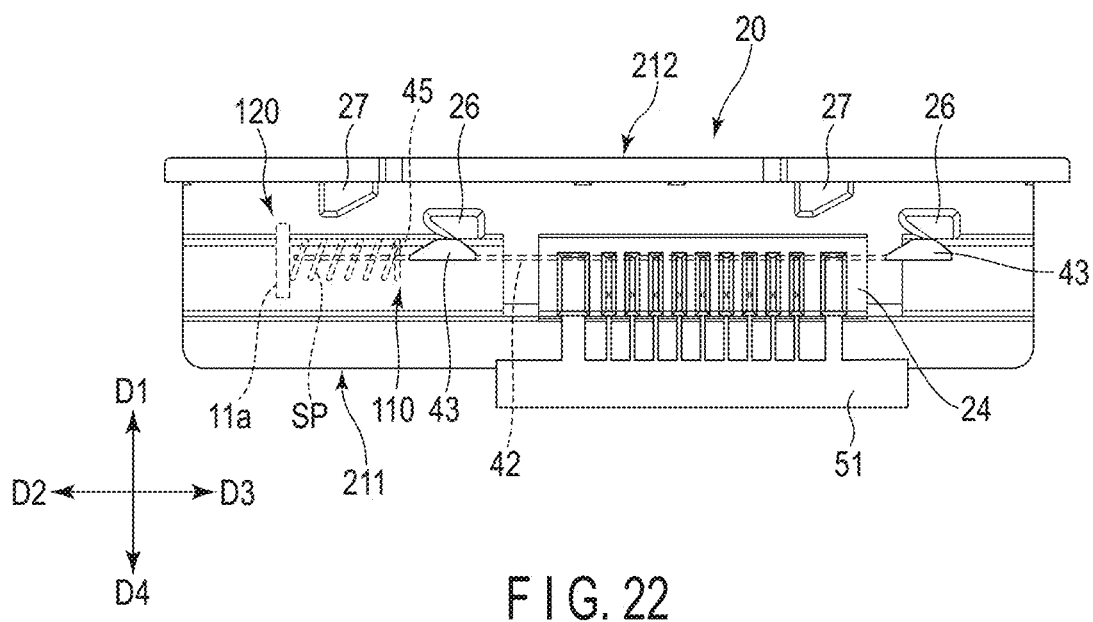
FIG. 22 is a view for explaining a holding mechanism included in the detaching/attaching mechanism.
Figure 23:
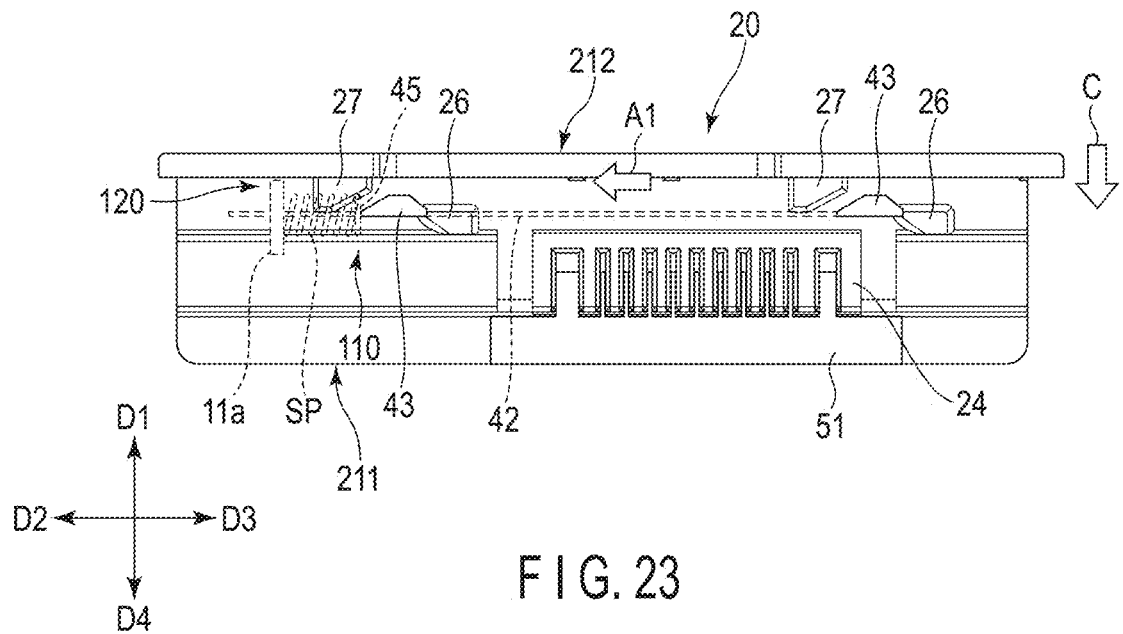
FIG. 23 is a view for explaining the holding mechanism included in the detaching/attaching mechanism.
Figure 24:
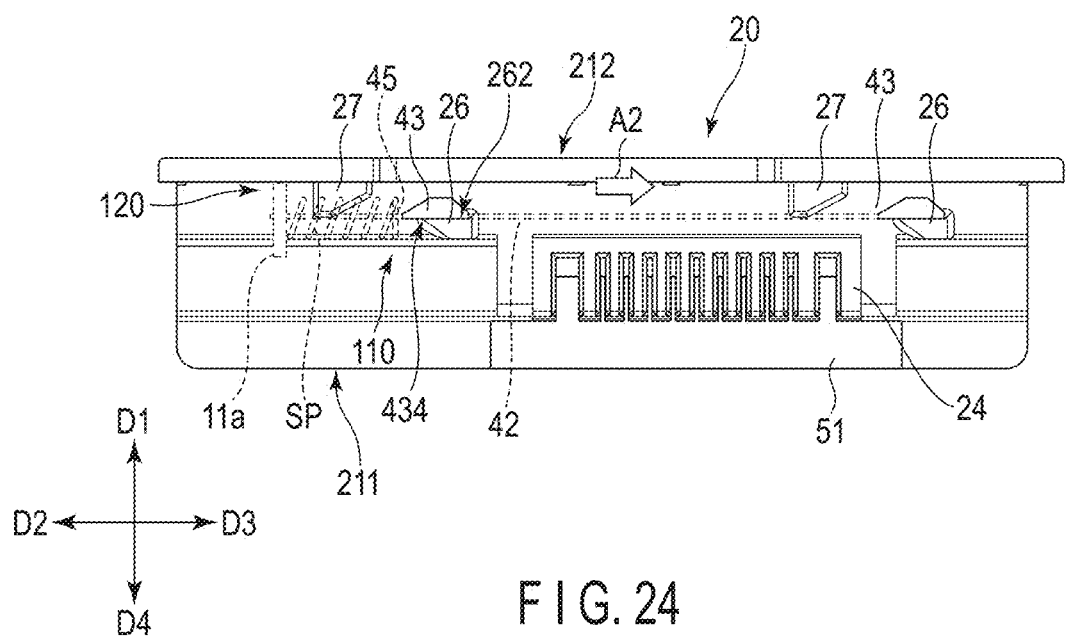
FIG. 24 is a view for explaining the holding mechanism included in the detaching/attaching mechanism.

FIGS. 22 to 24 are views for explaining the holding mechanism 120 included in the detaching/attaching mechanism 110. In FIGS. 22 to 24, parts positioned inside the housing 10 are indicated by broke lines. In FIG. 22, the state corresponding to the aforementioned released state is shown.

The position of the operating lever 40 relative to the housing 10 in the locked state and position of the operating lever 40 relative to the housing 10 in the released state are identical to each other. Accordingly, in the released state, the coil spring SP is compressed, and energizes the operating lever 40 in the third direction D3. From another point of view, the position of the operating lever 40 is held by the holding mechanism 120.

When the principal surface 212 of the battery pack 20 is pushed in the fourth direction D4 as indicated by an arrow C in FIG. 23, the abutting face 432 is slid along the abutting face 261, and protrusion 43 is moved in the second direction D2 as indicated by an arrow A1. The battery pack 20 is gradually moved in the fourth direction D4 with the movement of the protrusion 43 in the second direction D2. At this time, the receiving part 45 of the main body part 42 is moved in the second direction D2, and hence the coil spring SP is gradually compressed with the movement of the main body part 42.

When the protrusion 43 is further moved in the second direction D2, the coil spring SP is further compressed with the movement of the receiving part 45. The coil spring SP is compressed to the utmost in the half-released state. When the principal surface 212 of the battery pack 20 is further pushed from the half-released state in the fourth direction D4, the engaging face 434 is slid along the engaging face 262, and protrusion 43 is moved in the third direction D3 as indicated by an arrow A2 in FIG. 24.

At this time, in the process from the half-released state to the locked state, the coil spring SP energizes the main body part 42 in the third direction D3, and hence, by pushing the battery pack 20 in the fourth direction, the protrusion 43 can be moved in the third direction D3 without the user operating the operating lever 40. Thus, the protrusion 43 overlaps the protrusion 26 in the first direction D1, and the locked state is brought about as shown in FIG. 24.

In the locked state, the engaging face 262 is opposed to the engaging face 434. As described above, the coil spring SP is compressed in the locked state, and hence the operating lever 40 is energized in the third direction D3 by the coil spring SP. From another point of view, in the locked state, the position of the operating lever 40 is held by the holding mechanism 120.

With the configuration of the electronic device 100 of the second embodiment too, advantageous effects identical to the first embodiment can be obtained. Furthermore, in the electronic device 100 of the second embodiment, the detaching/attaching mechanism 110 includes the holding mechanism 120.

The position of the operating lever 40 is held by the holding mechanism 120, and hence it is possible to prevent the operating lever 40 from being moved in an unintended manner, and prevent the unexpected falling off of the battery pack 20 from occurring. In the process of detaching/attaching the battery pack 20 from/to the mounting part 30, it is possible for the user to save himself or herself operating the operating lever 40, and the detachability/attachability of the electronic device 100 is further improved.

It should be noted that although the example in which the energizing member is the coil spring SP has been disclosed, the energizing member is not limited to the spring member such as the coil spring SP or the like, and may be an elastic member or the like capable of energizing the operating lever 40 in the third direction or may be, for example, a small-sized actuator or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be noted that although in this embodiment, the mobile PC has been disclosed as an example of the electronic device 100, this embodiment is also applicable to electronic devices other than the mobile PC. This embodiment can also be applied to, for example, a notebook PC having an opening part for memory expansion.

The notebook PC concerned includes a housing having an opening part for memory expansion and lid attached to the opening part. The opening part is an example of the mounting part 30, and lid is an example of the installation component. By application of the configuration of each of the embodiments of the present invention, it is possible to improve the detachability/attachability at the time when the lid is detached/attached.

What is claimed is:

1. An electronic device comprising:
a housing having a mounting part including an inner wall part;
an installation component including a face at a position opposed to the inner wall part at the time when the installation component is installed into the mounting part and to be detachably attached to the mounting part; and
a detaching/attaching mechanism capable of detaching the installation component from the mounting part in a first direction, wherein
the detaching/attaching mechanism includes an operating lever including a first protrusion which includes a first abutting face and a second abutting face and which is provided in the mounting part and movable in a second direction different from the first direction, a second protrusion which includes a third abutting face provided at such a position that the third abutting face can abut on the first abutting face and which is provided on the installation component so as to protrude from the face, and a third protrusion which includes a fourth abutting face provided at such a position that the fourth abutting face can abut on the second abutting face and is provided on the installation component so as to protrude from the face at a position separate from the second protrusion in the first direction and in the second direction,
the operating lever is provided in the housing in such a manner as to be movable in the second direction and in a third direction which is a direction opposite to the second direction between a first position at which the first abutting face of the first protrusion and the third abutting face of the second protrusion abut on each other and a second position at which the second abutting face of the first protrusion and the fourth abutting face of the third protrusion abut on each other after passing through the first position,
at least one of the first abutting face and the third abutting face is inclined in such a manner that relative positions of the first protrusion and the second protrusion in the first direction at the time when the operating lever is moved in the second direction in a state where the installation component is installed in the mounting part change in the first direction with the movement of the operating lever in the second direction, and
at least one of the second abutting face and the fourth abutting face is inclined in such a manner that relative positions of the first protrusion and the third protrusion in the first direction at the time when the operating lever is moved in the third direction after the installation component is moved in the first direction relatively to the mounting part by abutting of the first abutting face and the third abutting face on each other change in the first direction with the movement of the operating lever in the third direction.

2. The electronic device of claim 1, further comprising a first connector provided in the mounting part and a second connector provided on the installation component and holding the first connector therein, wherein
the second connector generates elastic force so as to laterally energize the first connector, and
when the first protrusion is moved from the state where the installation component is installed in the mounting part in the second direction and is moved to the first position, the first connector is caught by the elastic force of the second connector at only each tip end part thereof.

3. The electronic device of claim 1, wherein
the third protrusion further includes an engaging face to be engaged with a face different from the first abutting face and the second abutting face of the first protrusion, and
the operating lever is moved in such a manner that the different face of the first protrusion is at a position opposed to the engaging face in the state where the installation component is installed in the mounting part, whereby the first protrusion restrains the installation component from being moved in the first direction relatively to the housing.

4. The electronic device of claim 3, wherein
the detaching/attaching mechanism further includes a holding mechanism which holds the first protrusion provided on the operating lever in a state where the different face of the first protrusion and the engaging face are located at such positions that the different face and the engaging face are opposed to each other.

5. The electronic device of claim 4, wherein
the holding mechanism includes an energizing member which energizes the operating lever in a direction opposite to the second direction in the state where the installation component is installed in the mounting part.

* * * * *